(12) United States Patent
Geveci et al.

(10) Patent No.: US 7,558,665 B1
(45) Date of Patent: Jul. 7, 2009

(54) SYSTEM FOR DETERMINING CRITICAL ON-TIMES FOR FUEL INJECTORS

(75) Inventors: Mert Geveci, Columbus, IN (US);
Richard Reisinger, Columbus, IN (US);
Michael Robert Tidwell, Bloomington, IN (US); Andrew Osburn, Nashville, IN (US)

(73) Assignee: Cummins, Inc., Columbus, IN (US)

( * ) Notice: Subject to any disclaimer, the term of this patent is extended or adjusted under 35 U.S.C. 154(b) by 4 days.

(21) Appl. No.: 11/961,461

(22) Filed: Dec. 20, 2007

(51) Int. Cl.
*G06F 17/40* (2006.01)
*G01L 3/26* (2006.01)

(52) U.S. Cl. ...................... 701/104; 123/447

(58) Field of Classification Search ......... 701/102–105, 701/115; 123/446–447, 480, 497
See application file for complete search history.

(56) References Cited

U.S. PATENT DOCUMENTS

| | | | |
|---|---|---|---|
| 0,686,935 A | 11/1901 | Flaman | |
| 4,242,728 A * | 12/1980 | Hartford | ...................... 701/112 |
| 4,459,955 A * | 7/1984 | Adey et al. | .................. 123/357 |
| 6,085,142 A | 7/2000 | Di Leo et al. | |
| 6,353,791 B1 | 3/2002 | Tuken et al. | |
| 6,557,530 B1 | 5/2003 | Benson et al. | |
| 6,823,834 B2 | 11/2004 | Benson et al. | |
| 6,917,875 B2 | 7/2005 | Boysen et al. | |
| 6,918,376 B2 * | 7/2005 | Oono et al. | .................. 123/458 |
| 6,990,855 B2 | 1/2006 | Tuken et al. | |
| 7,007,676 B1 | 3/2006 | Schuricht et al. | |
| 7,025,047 B2 | 4/2006 | Leman et al. | |
| 7,437,234 B2 * | 10/2008 | Halleberg | .................... 701/104 |

* cited by examiner

*Primary Examiner*—Hieu T Vo
(74) *Attorney, Agent, or Firm*—Barnes & Thornburg LLP; J. Bruce Schelkopf, Esq.

(57) ABSTRACT

A fuel system has a source of fuel coupled to a plurality of fuel injectors via a fuel rail. The system is operable to determining a critical on-time for a selected one of the injectors by disabling fuel flow from the source of fuel to the fuel rail, periodically sampling fuel rail pressure, activating the selected injector for an on-time duration while inhibiting injection by remaining ones of the injectors, determining from the fuel rail pressure samples a pressure drop resulting from activation of the selected injector for the on-time duration, processing the pressure drop to determine whether or not the selected injector injected fuel, and repeatedly modifying the on-time duration followed by executing the sampling, activating, determining and processing steps until a critical on-time is determined that corresponds to a minimum on-time duration to which the selected fuel injector is responsive to inject a discernable amount of fuel.

23 Claims, 16 Drawing Sheets

US 7,558,665 B1

SYSTEM FOR DETERMINING CRITICAL ON-TIMES FOR FUEL INJECTORS

FIELD OF THE INVENTION

The present invention relates generally to electronically controlled fuel systems for internal combustion engines, and more specifically to systems for determining critical on-times associated with fuel injectors for internal combustion engines.

BACKGROUND

Electronically controlled fuel systems for internal combustion engines typically include one or more fuel injectors responsive to one or more corresponding activation signals to inject fuel into the engine. It is desirable to monitor injected fuel quantities in order to evaluate, at least in part, operation of the one or more fuel injectors.

SUMMARY

The present invention may comprise one or more of the features recited in the attached claims, and/or one or more of the following features and combinations thereof. A method of determining a critical on-time for a selected one of a plurality of fuel injectors coupled to a source of fuel via a fuel rail of a fuel system for an internal combustion engine may comprise disabling fuel flow from the source of fuel to the fuel rail, periodically sampling fuel rail pressure, activating the selected fuel injector for an on-time duration while inhibiting fuel injection by remaining ones of the plurality of fuel injectors, determining from the fuel rail pressure samples a first pressure drop in the fuel rail resulting from activation of the selected fuel injector for the on-time duration, processing the first pressure drop to determine whether or not the selected fuel injector injected fuel into the engine in response to activation for the on-time duration, repeatedly modifying the on-time duration and then executing the periodically sampling, activating, determining and processing steps until a critical on-time is determined that corresponds to a minimum on-time duration to which the selected fuel injector is responsive to inject a discernable amount of fuel into the engine.

The method may further comprise storing the critical on-time for the selected fuel injector in a memory unit.

Periodically sampling, activating, determining, processing and repeatedly modifying may be carried out for remaining ones of the plurality of fuel injectors to determine a critical on-time for each of the remaining ones of the plurality of fuel injectors.

The on-time duration may be initially selected such that activation of the selected fuel injector for the on-time duration does not result in injection of any discernable amount of fuel into the engine. Repeatedly modifying the on-time duration may then comprise successively incrementing the on-time duration by an increment value. Alternatively, the on-time duration may be initially selected such that activation of the selected fuel injector for the on-time duration results in injection of fuel into the engine. Repeatedly modifying the on-time duration may then comprise successively decrementing the on-time duration by a decrement value. Alternatively still, repeatedly modifying the on-time duration may comprise selecting on-time durations on either side of an expected critical on-time for the selected injector and then incrementally advancing the on-time duration toward the expected critical on-time until the minimum on-time duration is determined.

Each execution of the periodically sampling, activating, determining and processing steps may be carried out over a single engine cycle.

The method may further comprise determining from the fuel rail pressure samples a second pressure drop in the fuel rail pressure resulting from leakage of fuel by the fuel system when none of the plurality of fuel injectors is injecting fuel into the engine, and determining from the fuel pressure samples a mean value of the fuel pressure samples. Processing the first pressure drop may further comprise processing the first pressure drop, the second pressure drop and the mean value of the fuel pressure samples to determine whether or not the selected fuel injector injected fuel into the engine in response to activation of the selected fuel injector for the on-time duration. The processing step may comprise processing the first pressure drop, the second pressure drop and the mean value of the fuel pressure using a first discriminant function to produce an inject value corresponding to a likelihood that the activation of the selected fuel injector for the on-time duration resulted in injection of fuel by the selected fuel injector into the engine, processing the first pressure drop, the second pressure drop and the mean value of the fuel pressure using a second discriminant function to produce an inject-not value corresponding to a likelihood that the activation of the selected fuel injector for the on-time duration resulted in no injection of fuel by the selected fuel injector into the engine, and processing the inject and inject not values to produce an inject/no-inject value, the inject/no-inject value having a value indicating that the selected fuel injector injected fuel into the engine in response to activation of the selected fuel injector for the on-time duration if the inject value is greater than the inject-not value, and otherwise having a value indicating that the selected fuel injector did not inject fuel into the engine in response to activation of the selected fuel injector for the on-time duration. Each execution of the steps of periodically sampling, activating, determining the first pressure drop, determining the second pressure drop, determining the mean value of the fuel pressure, processing the first pressure drop, processing the second pressure drop and processing the inject and inject not values may be carried out over a single engine cycle. The method may further comprise processing a number of inject/no-inject values produced over a corresponding number of engine cycles to according to a voting process to determine whether or not the selected fuel injector injected fuel into the engine in response to activation of the selected fuel injector for the on-time duration.

Processing the number of inject/no-inject values may comprise determining a vote number corresponding to a number of times over the number of engine cycles that the inject/no-inject value indicates that the selected fuel injector injected fuel into the engine in response to activation of the selected fuel injector for the on-time duration, determining that the selected fuel injector injected fuel into the engine in response to activation of the selected fuel injector for the on-time duration if the vote number reaches a pass count value, and otherwise determining that the selected fuel injector did not inject a discernable amount of fuel into the engine in response to activation of the selected fuel injector for the on-time duration. Processing the number of inject/no-inject values may alternatively comprise determining a vote number corresponding to a number of times that the inject/no-inject value indicates that the selected fuel injector injected fuel into the engine in response to activation of the selected fuel injector for the on-time duration, determining that the selected fuel injector injected fuel into the engine in response to activation of the selected fuel injector for the on-time duration if the vote number reaches a pass count value before the number of engine cycles reaches an engine cycle count value, and determining that the selected fuel injector did not inject a discernable amount of fuel into the engine in response to activation of the selected fuel injector for the on-time duration if the number of engine cycles reaches the engine cycle count value before the vote number reaches the pass count value.

The method may further comprise filtering the second pressure drop over time to produce a filtered parasitic leakage value, comparing the filtered parasitic leakage value to a leakage threshold value, and storing an excessive parasitic leakage value, that is indicative of an excessive parasitic leakage condition, in a memory unit in a memory unit if the filtered parasitic leakage value is greater than the leakage threshold value.

A system for determining a critical on-time for a selected one of a plurality of fuel injectors in a fuel system for an internal combustion engine may comprise a fuel inlet metering valve having an inlet fluidly coupled to a source of fuel, a fuel pump having an inlet coupled to an outlet of the fuel inlet metering valve, a fuel rail coupled to an outlet of the fuel pump, a pressure sensor fluidly coupled to the fuel rail and configured to produce a pressure signal indicative of fuel pressure within the fuel rail, a plurality of fuel injectors fluidly coupled to the fuel rail, and a control circuit including a memory having instructions stored therein that are executable by the control circuit to control the fuel inlet metering valve to disable fuel flow from the source of fuel to the fuel rail, to periodically sample the pressure signal, to activate the selected fuel injector for an on-time duration while inhibiting fuel injection by remaining ones of the plurality of fuel injectors, to determine from the pressure signal samples a first pressure drop in the fuel rail resulting from activation of the selected fuel injector for the on-time duration, to process the first pressure drop to determine whether or not the selected fuel injector injected fuel into the engine in response to activation for the on-time duration, and to repeatedly modify the on-time duration and then execute the periodically sampling, activating, determining and processing steps until a critical on-time is determined that corresponds to a minimum on-time duration to which the selected fuel injector is responsive to inject a discernable amount of fuel into the engine.

The instructions stored in the memory may further include instructions that are executable by the control circuit to determine from the pressure signal samples a second pressure drop in the fuel rail pressure resulting from leakage of fuel by the fuel system when none of the plurality of fuel injectors is injecting fuel into the engine, and to determine from the pressure signal samples a mean value of the pressure signal samples. The instructions stored in the memory may further include instructions that are executable by the control circuit to determine whether or not the selected fuel injector injected fuel into the engine in response to activation for the on-time duration by processing the first pressure drop, the second pressure drop and the mean value of the fuel pressure samples to determine whether or not the selected fuel injector injected fuel into the engine in response to activation of the selected fuel injector for the on-time duration.

The instructions stored in the memory may further include instructions that are executable by the control circuit to determine whether or not the selected fuel injector injected fuel into the engine in response to activation for the on-time duration by processing the first pressure drop, the second pressure drop and the mean value of the fuel pressure using a first discriminant function to produce an inject value corresponding to a likelihood that the activation of the selected fuel injector for the on-time duration resulted in injection of fuel by the selected fuel injector into the engine, by processing the first pressure drop, the second pressure drop and the mean value of the fuel pressure using a second discriminant function to produce an inject-not value corresponding to a likelihood that the activation of the selected fuel injector for the on-time duration resulted in no injection of fuel by the selected fuel injector into the engine, and by processing the inject and inject not values to produce an inject/no-inject value, the inject/no-inject value having a value indicating that the selected fuel injector injected fuel into the engine in response to activation of the selected fuel injector for the on-time duration if the inject value is greater than the inject-not value, and otherwise having a value indicating that the selected fuel injector did not inject fuel into the engine in response to activation of the selected fuel injector for the on-time duration.

The instructions stored in the memory may be executable by the control circuit to produce the inject/no-inject value during a single engine cycle. The instructions stored in the memory may further include instructions that are executable by the control circuit to process a number of inject/no-inject values produced over a corresponding number of engine cycles to according to a voting process to determine whether or not the selected fuel injector injected fuel into the engine in response to activation of the selected fuel injector for the on-time duration. The instructions stored in the memory may further include instructions that are executable by the control circuit to process the number of inject/no-inject values by determining a vote number corresponding to a number of times over the number of engine cycles that the inject/no-inject value indicates that the selected fuel injector injected fuel into the engine in response to activation of the selected fuel injector for the on-time duration, by determining that the selected fuel injector injected fuel into the engine in response to activation of the selected fuel injector for the on-time duration if the vote number reaches a pass count value, and by otherwise determining that the selected fuel injector did not inject a discernable amount of fuel into the engine in response to activation of the selected fuel injector for the on-time duration.

The instructions stored in the memory may further include instructions that are executable by the control circuit to process the number of inject/no-inject values by determining a vote number corresponding to a number of times that the inject/no-inject value indicates that the selected fuel injector injected fuel into the engine in response to activation of the selected fuel injector for the on-time duration, by determining that the selected fuel injector injected fuel into the engine in response to activation of the selected fuel injector for the on-time duration if the vote number reaches a pass count value before the number of engine cycles reaches an engine cycle count value, and by determining that the selected fuel injector did not inject a discernable amount of fuel into the engine in response to activation of the selected fuel injector for the on-time duration if the number of engine cycles reaches the engine cycle count value before the vote number reaches the pass count value.

The instructions stored in the memory may further include instructions that are executable by the control circuit to store the critical on-time in the memory.

The instructions stored in the memory may further include instructions that are executable by the control circuit to determine critical on-times for remaining ones of the plurality of fuel injectors.

The instructions stored in the memory may further include instructions that are executable by the control circuit to determine the critical on-time using the pressure signal sampled over a single engine cycle.

DESCRIPTION OF THE ILLUSTRATIVE EMBODIMENTS

For the purposes of promoting an understanding of the principles of the invention, reference will now be made to a number of illustrative embodiments shown in the attached drawings and specific language will be used to describe the same.

Figure 1:
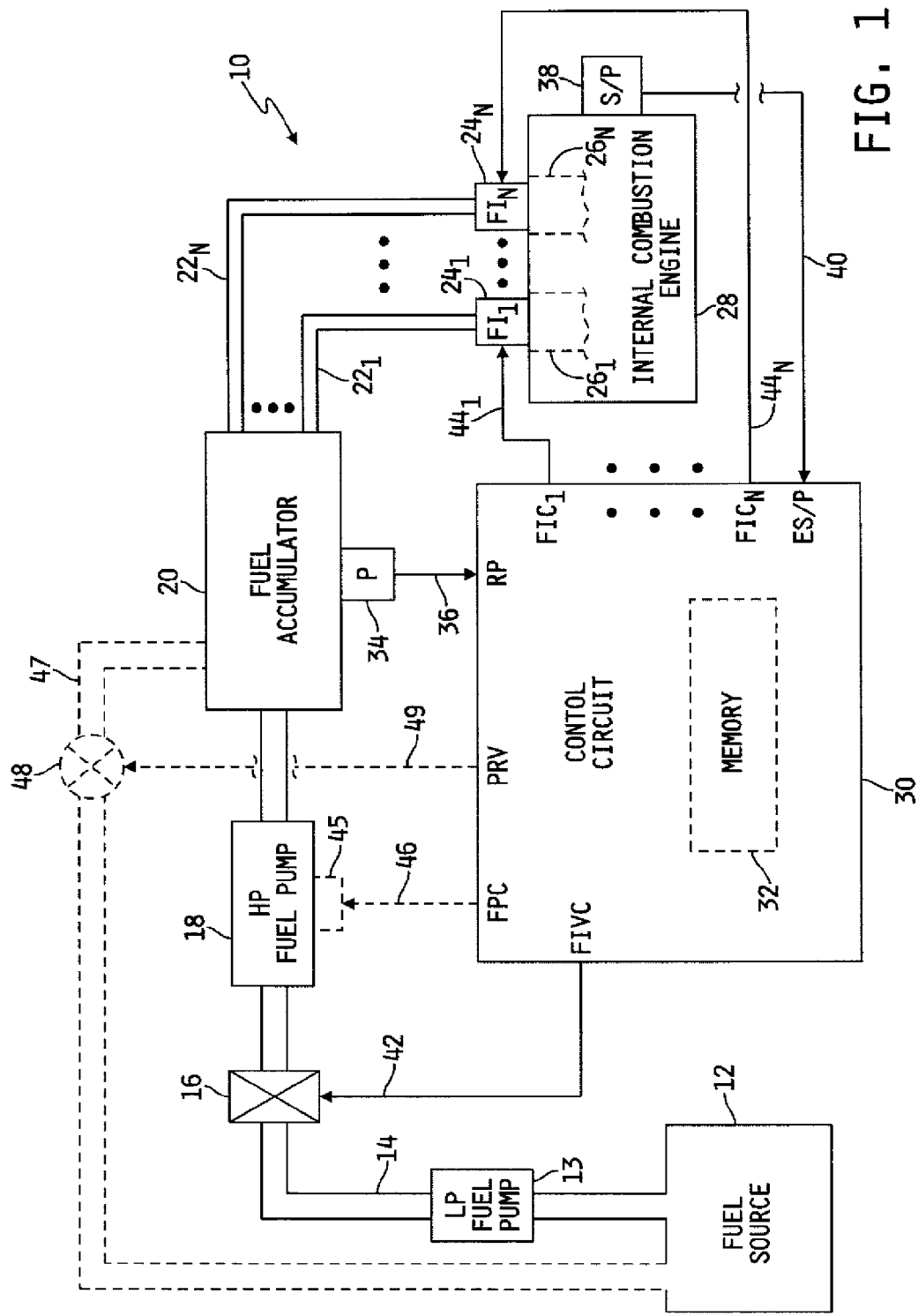
FIG. 1 is a block diagram of one illustrative embodiment of a system for monitoring injected fuel quantities.

Referring now to FIG. 1, a block diagram of one illustrative embodiment of a system 10 for monitoring injected fuel quantities as shown. In the illustrated embodiment, the system 10 includes a conventional fuel source 12 that is carried by a vehicle in which the system 10 resides. The fuel source 12 is fluidly coupled via a conduit 14 to an inlet of a fuel inlet metering valve 16. A conventional low pressure fuel pump 13 is positioned in-line with the conduit 14, and is configured to supply low pressure fuel to a fuel inlet of the inlet metering valve 16 from the source of fuel 12. A fuel outlet of the fuel inlet metering valve 16 is fluidly coupled to a fuel inlet of a conventional high pressure fuel pump 18, and a fuel outlet of the fuel pump 18 is fluidly coupled to a fuel inlet of a conventional fuel accumulator 20. Illustratively, the fuel pump 18 is a conventional high pressure fuel pump, although this disclosure contemplates that other conventional fuel pumps may alternatively be used. The fuel accumulator 20 is also fluidly coupled via a number, N, of fuel conduits $22_1$-$22_N$ to a corresponding number of conventional fuel injectors $24_1$-$24_N$, wherein N may be any positive integer. Each of the fuel injectors $24_1$-$24_N$ is fluidly coupled to a different one of the number of fuel conduits $22_1$-$22_N$, and also to a corresponding number of cylinders $26_1$-$26_N$ of an internal combustion engine 28. The fuel accumulator 20 may alternatively be referred to as a fuel rail, and the terms "accumulator" and "rail" may accordingly be used interchangeably herein. Illustratively, the internal combustion engine 28 may be a conventional diesel engine, in which case the fuel source 12 holds a quantity of conventional diesel fuel. Alternatively, the internal combustion engine 28 may be configured to combust different types of fuel, e.g., gasoline, gasoline-oil mix, or the like, in which case the fuel source 12 holds a quantity of corresponding fuel.

The system 10 further includes a control circuit 30 having, or having access to, a memory unit 32. Illustratively, the control circuit 30 may be microprocessor-based, although this disclosure contemplates embodiments in which the control circuit 30 alternatively includes one or more other conventional signal processing circuits. In any case, the control circuit 30 is configured to process input signals, and to produce output control signals in a manner that will be described hereinafter. In embodiments in which the control circuit 30 is microprocessor-based and/or in which the control circuit 30 includes decision-making circuit generally, the memory unit 32 has stored therein instructions that are executable by the control circuit 30 to accomplish any one or more of the tasks described herein.

The control circuit 30 includes a number of inputs configured to receive electrical signals produced by a number of sensors. One such sensor, for example, is a conventional pressure sensor 34 that is electrically connected to a rail pressure input, RP, of the control circuit via a signal path 36. In the illustrated embodiment, the pressure sensor 34 is configured to produce a pressure signal corresponding to the fuel pressure within the fuel accumulator or rail 20. The pressure signal produced by the pressure sensor 34 will be referred to herein as a rail pressure signal that is indicative of a fuel pressure within the fuel accumulator or rail 20.

The system 10 further includes an engine speed and position sensor 38 that is operatively coupled to the internal combustion engine 28 and that is electrically connected to an engine speed and position input, ES/P of the control circuit 30 via a signal path 40. The engine speed and position sensor 38 is illustratively a conventional sensor that is configured to produce a signal from which the rotational speed (e.g., engine speed, ES) of the engine 28 can be determined and from which the engine position (EP), e.g., the angle of the engine crank shaft (not shown) relative to a reference angle, can be determined.

The control circuit 30 further includes a number of outputs via which the control circuit 30 produces control signals for controlling a number of actuators associated with the system 10. For example, the system 10 includes a fuel inlet metering valve 16, as described hereinabove, and a fuel inlet valve control output, FIVC, of the control circuit 30 is electrically connected to the fuel inlet metering valve 16 via a signal path 42. The control circuit 30 is configured to control operation of the fuel inlet metering valve 16 via the FIVC output between an open position in which fuel may flow from the fuel source 12 to the fuel pump 18, and a closed position in which fuel from the fuel source 12 may not flow from the fuel pump 18.

In some embodiments, the system 10 may further include a fuel pump actuator 45 that is coupled to the fuel pump 18 and that is electrically connected to a fuel pump control output, FPC, of the control circuit 30 via a signal path 46, as shown by dashed-line representation in FIG. 1. In embodiments that include these components, the fuel pump actuator 46 is responsive to fuel pump command signals produced by the control circuit 30 on the signal path 46 to control operation of the fuel pump 18 in a conventional manner.

In some embodiments, the system 10 may further include a fuel return conduit 47 having one end that is fluidly coupled to the fuel accumulator or rail 20 and an opposite end that is fluidly coupled to the fuel source 12. A pressure relief valve 48 may be positioned in-line with the fuel return conduit 47 and may be electrically connected to a pressure relief valve output, PRV, of the control circuit 30 via a signal path 49, as shown by dashed-line representation in FIG. 1. In embodiments that include these components, the pressure relief valve 48 is responsive to a pressure relief valve control signal produced by the control circuit 30 on the signal path 49 to control operation of the pressure relief valve 48 in a conventional manner.

The control circuit 30 further includes a number, N, of fuel injector control outputs, $FIC_1$-$FIC_N$, each of which is electrically connected to a corresponding one of the number of fuel injectors $24_1$-$24_N$ via a corresponding one of a number of signal paths $44_1$-$44_N$. Each of the fuel injectors $24_1$-$24_N$ is responsive to a corresponding control signal produced by the control circuit 30 to inject fuel into a corresponding one of the number of cylinders $26_1$-$26_N$ for a specified on-time which begins at a specified start-of-injection timing. Illustratively, the start-of-injection timing is specified relative to a predefined engine position, e.g., crank angle, associated with each cylinder. More specifically, for example, the start-of-injection timing for each cylinder $26_1$-$26_N$ may be determined relative to a top-dead-center (TDC) crank angle that is different for each of the number of cylinders $26_1$-$26_N$. It will be understood, however, that the start-of-injection timing may be specified using other conventional techniques.

Figure 2:
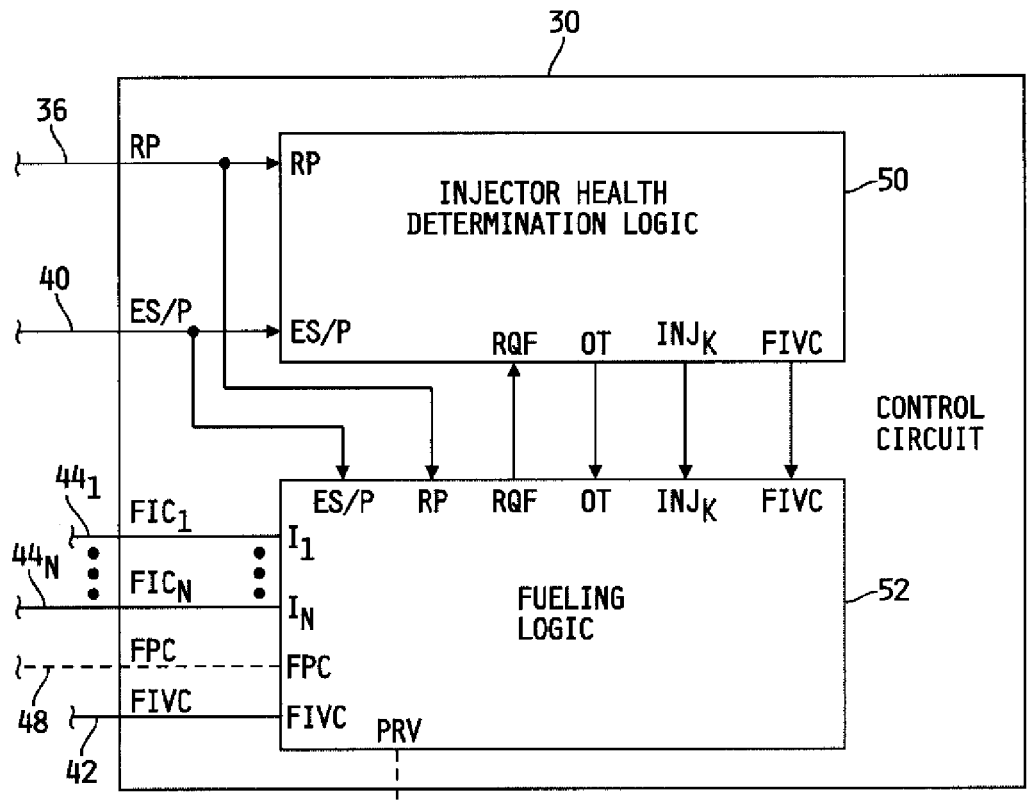
FIG. 2 is a block diagram of one illustrative embodiment of control logic forming part of the control circuit of FIG. 1.

Referring now to FIG. 2, one illustrative embodiment of at least some of the control logic within the control circuit 30 of the system 10 is shown. Illustratively, the control logic illustrated in FIG. 2 is stored in the memory unit 32 of the control circuit 30 in the form of one or more sets of instructions, e.g., software code, executable by the control circuit 30 to control operation of the control system 10. In the illustrated embodiment, the control circuit 30 includes an injector health determination logic block 50 and a fueling logic block 52. The injector health determination logic block receives as inputs the rail pressure signal, RP, produced by the pressure sensor 34, the engine speed and position signal, ES/P, produced by the speed and position sensor 38 and a requested fueling value, RQF, from the fueling logic block 52. The requested fueling value, RQF, is a conventional fueling value that represents user-requested fueling, e.g., via user actuation of a conventional accelerator pedal (not shown) and/or user-setting of a conventional cruise control unit (not shown), which may be further limited or modified by one or more conventional algorithms resident within the memory 32 and executed by the control circuit 30. For purposes of this document, the requested fuel value, RFQ, generally corresponds to a request for delivery of fuel by the fuel system to the engine 28. The injector health determination logic block 50 is configured to produce output values corresponding to injector on-time, OT, injector identification number, $INJ_K$, and a fuel inlet metering valve control value, FIVC. Determination of these output values by the injector health determination logic block 50 will be described in greater detail hereinafter.

The fueling logic block 52 receives as inputs the rail pressure signal, RP, the engine speed and position signal, ES/P, and the OT, $INJ_K$ and FIVC valves produced by the injector health determination logic block 50. In addition to the requested fueling value, RQF, the fueling logic block 52 is configured to produce as outputs the fuel injector control signals, $FIC_1$-$FIC_N$, and the fuel inlet metering valve control signal, FIVC, and in some embodiments the fuel pump command signal, FPC, and/or the pressure relief valve signal, PRV. During the normal operation of the internal combustion engine 28, i.e., when the injector health determination logic block is not enabled for operation, the fueling logic block 52 is operable in a conventional manner to control the system 10 to supply fuel to the various cylinders $26_1$-$26_N$ of the engine 28. When the injector health determination logic block 50 is enabled for operation, operation of the fueling logic block 52 is conventional with the exception that the fuel injector on-time signals and the fuel inlet metering inlet valve control signal (and/or the fuel pump command signal and/or the pressure relieve valve signal, in embodiments that include either or both of the fuel pump actuator 45 and the pressure relief valve 48) are specified by the injector health determination logic block 50 in a manner that will be described in greater detail hereinafter.

Figure 3:
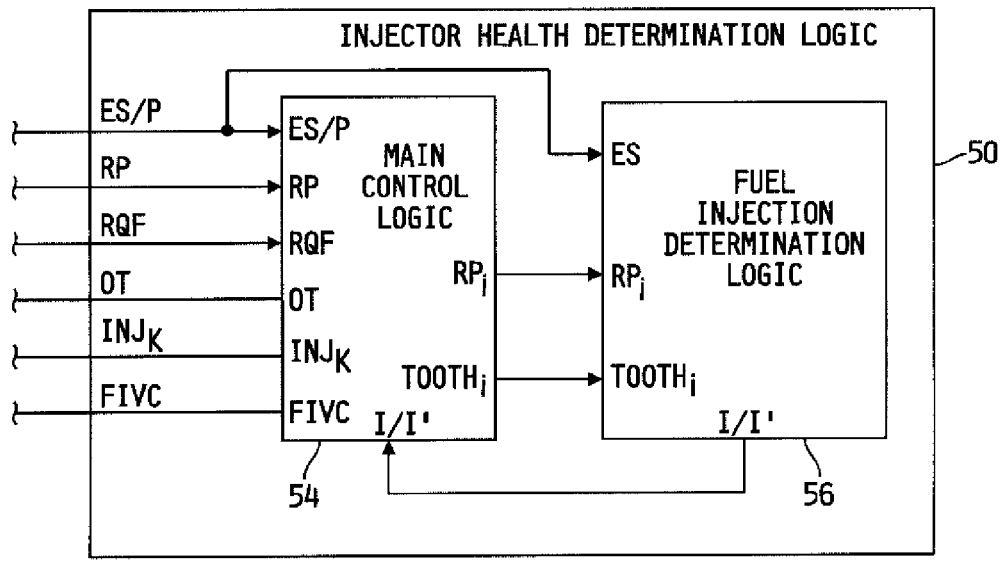
FIG. 3 is a block diagram of one illustrative embodiment of the injector health determination logic block of FIG. 2.

Referring now to FIG. 3, one illustrative embodiment of the injector health determination logic block 50 is shown. In the illustrated embodiment, the injector health determination block 50 includes a main control logic block 54 and a fuel injection determination logic block 56. The main control logic block 54 receives as inputs the engine speed and position signal, ES/P, the rail pressure signal, RP, the requested fueling value, RQF, and inject/no-inject value, I/I' that is produced by the fuel injection determination logic block 56. The main control logic block 54 is operable to produce as outputs the on-time value, OT, the injector identification value, $INJ_K$, and the fuel inlet metering value command value, FIVC. The fuel injection determination logic block 56 receives as inputs the engine speed value, ES, which is taken from the engine speed and position signal, ES/P, an instantaneous rail pressure value, $RP_i$, produced by the main control logic block 54, and a corresponding individual tooth number, $TOOTH_i$ that is produced by the main control logic block 54.

Figure 4A:
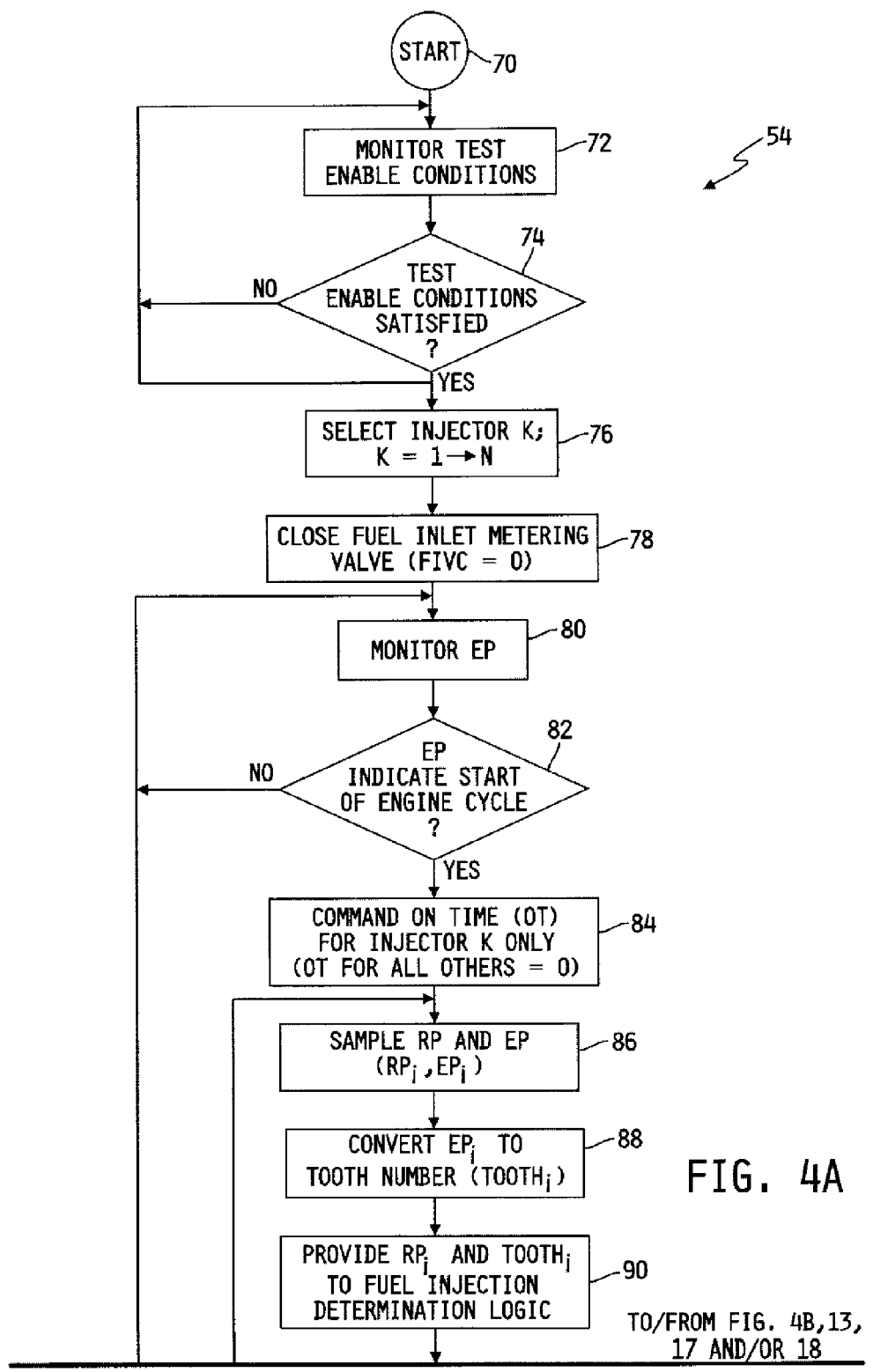
FIGS. 4A and 4B are a flowchart of one illustrative embodiment of the main control logic block of FIG. 3.
Figure 4B:
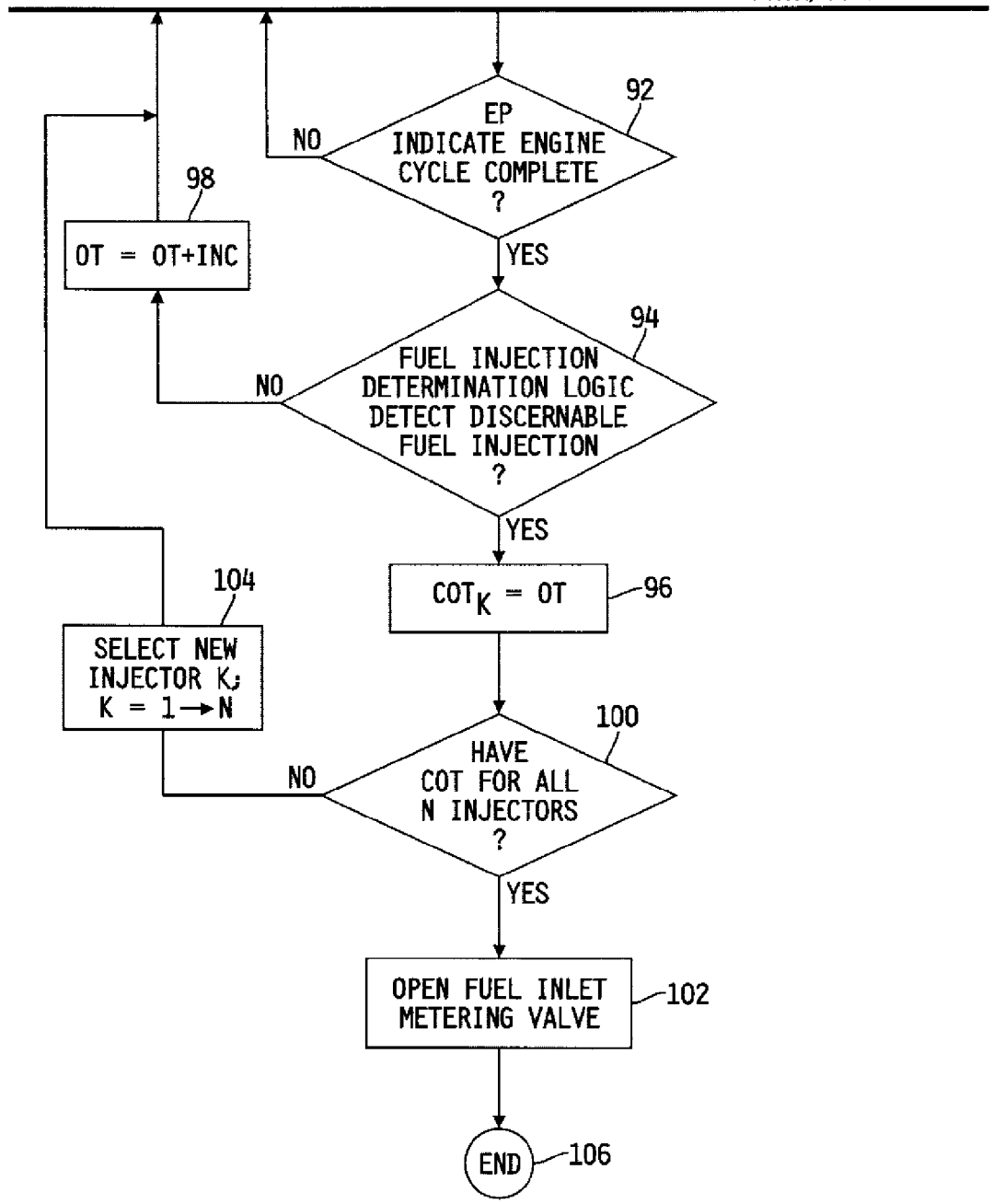

Referring now to FIGS. 4A and 4B, a flow chart of one illustrative embodiment of a software algorithm 54 representing the main control logic block 54 of FIG. 3 is shown. In the illustrated embodiment, the algorithm 54 begins at step 70, and thereafter at step 72 the main control logic block 54 is operable to monitor one or more test enable conditions which must be satisfied before the injector health determination logic block 50 of FIG. 2 may be enabled for operation. Illustratively, the test conditions monitored by the main control logic block 54 at step 72 include monitoring the requested fuel value, RQF, produced by the fueling logic block 52, the rail pressure signal, RP, and the engine speed and position signal, ES/P. Thereafter at step 74, the main control logic block 54 is operable to determine whether the test conditions monitored at step 72 have been satisfied. Illustratively, the main control logic block 54 is operable at step 74 to determine whether the test conditions monitored at step 72 have been satisfied by determining whether the requested fuel value, RQF, corresponding to a request for fuel delivered by the fuel system to the engine 28, is below a threshold fueling level, $F_{TH}$, e.g., corresponding to a vehicle motoring condition or zero requested fueling, whether the rail pressure, RP, is above a rail pressure threshold, $RP_{TH}$, and whether the engine speed portion of the engine speed and position signal, ES/P, is above a speed threshold. If the main control logic block 54 determines at step 74 that the requested fuel value, RQF, is not less than the threshold fueling level, $F_{TH}$, the rail pressure, RP, is not above the rail pressure threshold, $RP_{TH}$, or the engine speed is not above engine speed threshold, $ES_{TH}$, execution of the algorithm 54 looks back to step 72 to continue monitoring the test enable conditions. If, however, the main control logic block 54 determines at step 74 that the requested fuel value, RQF, is less than $F_{TH}$, the rail pressure, RP, is above $RP_{TH}$, and the engine speed, ES, is above $ES_{TH}$, execution of the algorithm 54 advances to step 76. It will be understood that the foregoing test enable conditions monitored and tested by the main control logic block 54 at step 72 and 74 represent only one set of example test conditions, and that more, fewer and/or different test enable conditions may be monitored and tested at steps 72 and 74. It will be noted that the "YES" branch of step 74, in addition to advancing to step 76, also loops back to step 72. For purposes of this document, the loop between the "YES" branch of step 74 and step 72 indicates that the test enable conditions are continually monitored and tested at steps 72 and 74 throughout the algorithm 54. Thus, if at any time during the execution of the algorithm 54, one or more of the test enable conditions described above is not satisfied, i.e., is no longer true, execution of the algorithm 54 loops between steps 72 and 74 until all such test enable conditions are satisfied, and the algorithm 54 then restarts at step 76.

At step 76, the main control logic block 54 is operable to determine a Kth one of the number of fuel injectors $24_1$-$24_N$ for testing. The value of K may be selected randomly between 1 and N, or may alternatively be selected to follow a predetermined sequence of injectors, e.g., so as to follow a predetermined fuel injection pattern. In any case, execution of the algorithm 54 advances from step 76 to step 78 where the main control logic block 54 is operable to produce a fuel inlet metering valve command, FIVC, that corresponds to a closed inlet metering valve 16, e.g., FIVC equals zero. The main control logic block 54 is then operable to produce a fuel inlet metering valve control signal on signal path 42 that closes the fuel inlet metering valve 16 so that no fuel flows from the fuel source 12 to the fuel pump 18. Step 78 is included in the algorithm 54 as a mechanism by which fuel flow to the fuel rail (e.g., the accumulator 20 and/or conduit 22) may be disabled. It will be understood that, for purposes of this disclosure, step 78 may additionally or alternatively be carried out by configuring the main control logic block 54 to produce a fuel pump command, FPC, that deactivates the fuel pump actuator 46, thereby disabling operation of the fuel pump 18, and/or by configuring the main control logic block 54 to produce a pressure relieve valve signal, PRV, that closes the pressure relief valve 48 to prevent fuel from escaping the fuel accumulator or rail 20 via the fuel conduit 47, in embodiments that include either the fuel pump actuator 45 and/or the pressure relief valve 48 respectively. Modifications to the main control logic block 54 to include either feature would be a mechanical step for a skilled artisan.

The algorithm 54 advances from step 78 to step 80 where the injector health determination logic block 50 is operable to monitor the engine position, EP, that is derived from the engine speed and position signal, ES/P on signal path 40. Thereafter at step 82, the injector health determination logic block 50 is operable to determine whether the engine position value, EP, indicates that the engine 28 is at the start of an engine cycle.

Illustratively, the start of an engine cycle corresponds to detection of a specified one of the teeth on a gear or wheel that is rotating synchronously with the engine crank shaft, and is different for each of the number of cylinders $26_1$-$26_N$ and corresponding fuel injectors $24_1$-$24_N$. For example, the start of an engine cycle relative to any of the number of cylinders $26_1$-$26_N$ generally corresponds to the so-called top-dead-center (TDC) position of the corresponding piston within the cylinder. Illustratively, the start of an engine cycle for any of the number of cylinders $26_1$-$26_N$ corresponds to the TDC of its corresponding piston, and is identified by the tooth on the engine position gear or wheel that corresponds to the TDC of the corresponding piston. The engine cycle, relative to any of the number of cylinders $26_1$-$26_N$, then corresponds to the amount of rotation of the engine crank shaft that occurs between adjacent TDC positions of the corresponding piston. In a conventional six-cylinder engine, for example, TDCs typically occur every 120 degrees of crank shaft rotation. In any case, a single engine cycle relative to any cylinder/piston is typically 720 degrees of engine crank shaft rotation. Those skilled in the art will recognize that other techniques and/or piston positions for identifying the start of an engine cycle for any of the cylinders $26_1$-$26_N$, and any such other techniques and/or piston positions are contemplated by this disclosure.

If the injector health determination logic block 50 determines at step 82 that the current engine position, EP, is not at the start of an engine cycle, execution of the algorithm 54 loops back to step 80 to continue to monitor the engine position, EP. If, at step 82, the injector health determination logic block 50 determines that the current engine position, EP, is at the start of an engine cycle, the algorithm 54 advances to step 84 where the injector health determination logic block 50 is operable to produce an on-time value, OT, for injector K, and to provide the on-time value, OT, to the fueling logic block 52. The on-times for all other injectors are set to zero. The fueling logic block 52 is operable, in turn, to command the on-time, OT, to the Kth one of the number of injectors $24_1$-$24_N$ via an appropriate one of the signal paths $44_1$-$44_N$.

Following step 84, execution of the algorithm 54 advances to step 86 where the injector health determination logic block 50 is operable to sample the rail pressure, RP, and the engine position, EP, to determine corresponding sampled rail pressure and engine position values, $RP_i$ and $EP_i$. Thereafter at step 88, the injector health determination logic block 50 is operable to convert $EP_i$ to a corresponding tooth number $TOOTH_i$, thereby identifying a particular tooth on the gear or wheel rotating synchronously with the engine crank shaft that corresponds to the particular engine position at which the rail pressure sample, $RP_i$, was taken. Thereafter at step 90, the injector health determination logic block 50 is operable to provide the rail pressure and tooth samples, $RP_i$ and $TOOTH_i$, respectively, to the fuel injection determination logic block 56 (see FIG. 3). Thereafter at step 92, the injector health determination logic block 50 is operable to determine whether the current engine position EP indicates that the current engine cycle is complete. If not, execution of the algorithm 54 loops back to step 86 to continue to sample the rail pressure and engine position RP and EP, respectively, for the remaining duration of the current engine cycle.

If, at step 92, the main control logic block 54 determines from the current engine position, EP, that the current engine cycle is complete, algorithm execution advances to step 94 where the main control logic block 54 is operable to determine whether the fuel injection determination logic block 56 detected any discernable fuel injection by the Kth injector resulting from the currently commanded on-time value, OT. Illustratively, the main control logic block 54 is operable to execute step 94 by monitoring the inject/no-inject value, I/I' produced by the fuel injection determination logic block 50 in a manner that will be described in greater detail hereinafter. In any case, if the main control logic block 54 determines at step 94 that the fuel injection determination logic block 56 did not detect any discernable fuel injection by the Kth injector in response to the currently commanded on-time value, OT, execution of the algorithm 54 advances to step 98 where the main control logic block 54 is operable to modify the current on-time value, OT, e.g., by incrementing OT by an increment value, INC. Illustratively, INC may range between 1-1000 microseconds, e.g., 100 microseconds, although other values of INC are contemplated. In any case, execution of the algorithm 54 loops from step 98 back to step 80 to monitor the current engine position value, EP.

If, at step 94, the main control logic block 54 determines that the fuel injection determination logic block 56 detects a discernable fuel injection amount by the Kth injector in response to the currently commanded on-time, OT, execution of the algorithm 54 advances to step 96 where the main control logic block 54 is operable to set a critical on-time value for the Kth injector, $COT_K$, to the currently commanded on-time value, OT, and to store the critical on-time value, $COT_K$, along with the injector identifier, K, in the memory unit 32. The critical on-time of any of the injectors $24_1$-$24_N$ is defined for purposes of this disclosure as a minimum on-time to which the fuel injector is responsive to inject a discernable quantity of fuel into a corresponding one of the cylinders $26_1$-$26_N$.

The algorithm 54 advances from step 96 to step 100 where the main control logic block 54 is operable to determine whether critical on-time values, COT, have been determined for all of the injectors $24_1$-$24_N$. If not, the algorithm 54 advances to step 104 where the main control logic block 54 is operable to select a new injector K from the remaining ones of the injector $24_1$-$24_N$ for which a critical on-time value, COT, has not been determined. From step 104, the algorithm 54 loops back to step 80. If, at step 100, the main control logic block 54 determines that critical on-time value, COT, have been determined for all of the injectors $24_1$-$24_N$, the algorithm 54 advances to step 102 where the main control logic block 54 is operable to produce a fuel inlet metering valve command value, FIVC, that corresponds to an open fuel inlet metering valve 16. The fueling logic block 50 is responsive to the fuel inlet metering valve command value, FIVC, produced by the injector health determination logic block 50 to command the fuel inlet metering valve 16 to an open position. Additionally, in embodiments that include the actuator 45, the control logic block 54 may be operable at step 102 to resume producing fuel pump commands, FPC. In embodiments that include the pressure relief valve 48, the control logic block 54 may be operable at step 102 to resume producing the pressure relief valve signals, PRV, as appropriate. In any case, the algorithm 54 advances from step 102 to step 106 where execution of the algorithm 54 ends.

One of the purposes of the algorithm 54 is to determine critical on-times, COT, for each of the injectors $24_1$-$24_N$. The algorithm 54, in the embodiment illustrated in FIGS. 4A and 4B, illustratively accomplishes this by setting the first on-time value, OT, at step 84 to an on-time value at which no discernable fuel injection is expected to be detected by the fuel injection determination logic block 56. The algorithm 54 proceeds to add incremental time values, INC, to the on-time value, OT, so that eventually the fuel injection determination logic block 56 will detect a discernable amount of fuel injection by the corresponding one of the fuel injectors $24_1$-$24_N$. It is when this discernable amount of fuel injection is detected that the algorithm 54 defines the critical on-time value, $COT_K$, for the Kth one of the number of fuel injectors $24_1$-$24_N$. Those skilled in the art will recognize other conventional techniques for selecting and/or modifying an initial on-time value, OT, to determine critical on-time values, COT, for each of the injectors $24_1$-$24_N$. For example, the initial on-time command value, OT, at step 80 may be set to an on-time value at which a discernable amount of injected fuel is expected to be detected by the fuel injection determination logic block 56, and step 98 may then be modified to decrement the on-time value, OT, until the fuel injection determination logic block 56 does not detect any discernable amount of fuel injection by the corresponding one of the fuel injectors $24_1$-$24_N$. In this embodiment, the most recently commanded on-time value that resulted in detection of a discernable amount of injected fuel by the currently commanded (e.g., Kth) one of the fuel injectors $24_1$-$24_N$ is the critical on-time, COT, for that injector. As another example, the algorithm 54 may be modified to implement a conventional "hunting" technique in which on-time values, OT, on either side, or on both sides, of an expected critical on-time value, COT, are used and which is/are then incrementally advanced toward the expected critical on-time value, COT, until a satisfactory value of the critical on-time value, COT, is determined. These and any other conventional techniques for modifying and/or selecting on-time command values, OT, to determine corresponding critical on-time values, COT, are contemplated by this disclosure.

Figure 5:
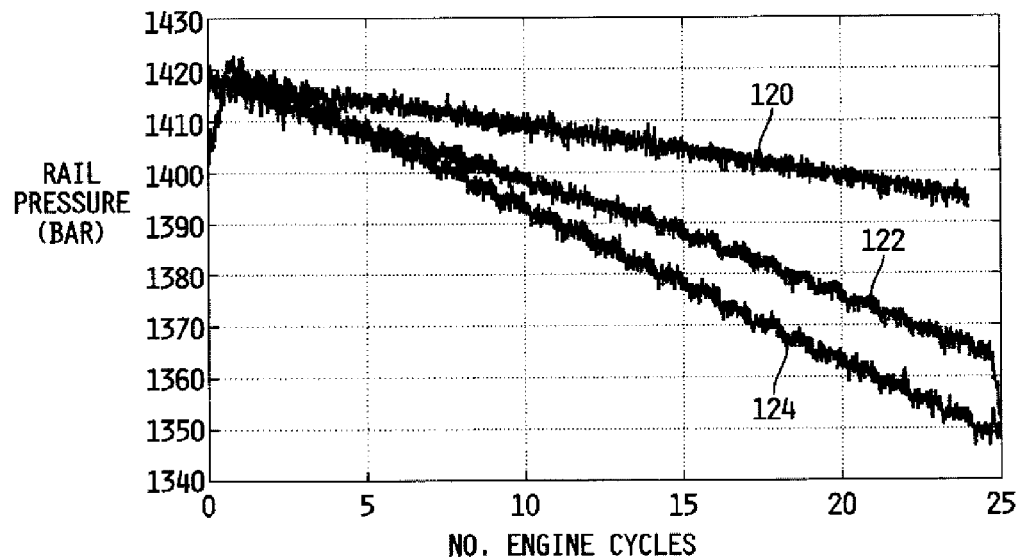
FIG. 5 is a plot of rail pressure vs. engine cycles illustrating decreasing rail pressure due to fuel injection and fuel leakage over a number of engine cycles under conditions illustrated in FIGS. 4A and 4B.

Referring now to FIG. 5, a plot of rail pressure, RP, over a number of consecutive engine cycles is shown that conceptually illustrates some of the features of the algorithm 54 illustrated in FIGS. 4A and 4B. The rail pressure plot of FIG. 5 illustrates the response of a single one of the fuel injectors $24_1$-$24_N$ to three different constant on-time values, OT, under vehicle motoring conditions, i.e., RQF equals zero, corresponding to zero requested fueling, and with the fuel inlet metering value 16 closed so that the fuel pump 18 cannot supply additional fuel from the fuel source 12 to the fuel accumulator or rail 20. The rail pressure waveform 120 represents the rail pressure response when the commanded on-time, OT, for all fuel injectors $24_1$-$24_N$ is zero, and therefore represents decreasing rail pressure due to the parasitic leakage of fuel from all of the fuel injectors $24_1$-$24_N$ during non-fuel injection operation. The rail pressure waveform 122 represents a rail pressure response to a first commanded on-time, OT that results in significant fuel injection into a corresponding one of the cylinders $26_1$-$26_N$, and therefore represents the combination of injected fuel and parasitic fuel leakage. The rail pressure waveform 124 represents a rail pressure response to a commanded on-time, OT, that is greater than the commanded on-time, OT, that produced the waveform 122, and therefore also represents decreasing rail pressure due to corresponding injected fuel quantities and parasitic fuel leakage. The wave forms 120, 122, 124 of FIG. 5 illustrate that the decreasing rail pressure under the stated conditions are substantially linear for both injected fuel quantities and for parasitic leakage. The fuel injection determination logic block 56 of FIG. 3 is configured, as will be described in greater detail hereinafter, to process the rail pressure and tooth samples, $RP_i$ and $TOOTH_i$ respectively, to determine corresponding rail pressure drop values resulting from fuel injection and from parasitic leakage, and to then determine from this information whether the corresponding one of the fuel injectors $24_1$-$24_N$ has or has not injected a discernable amount or quantity of fuel into a corresponding one of the cylinders $26_1$-$26_N$.

Figure 6:
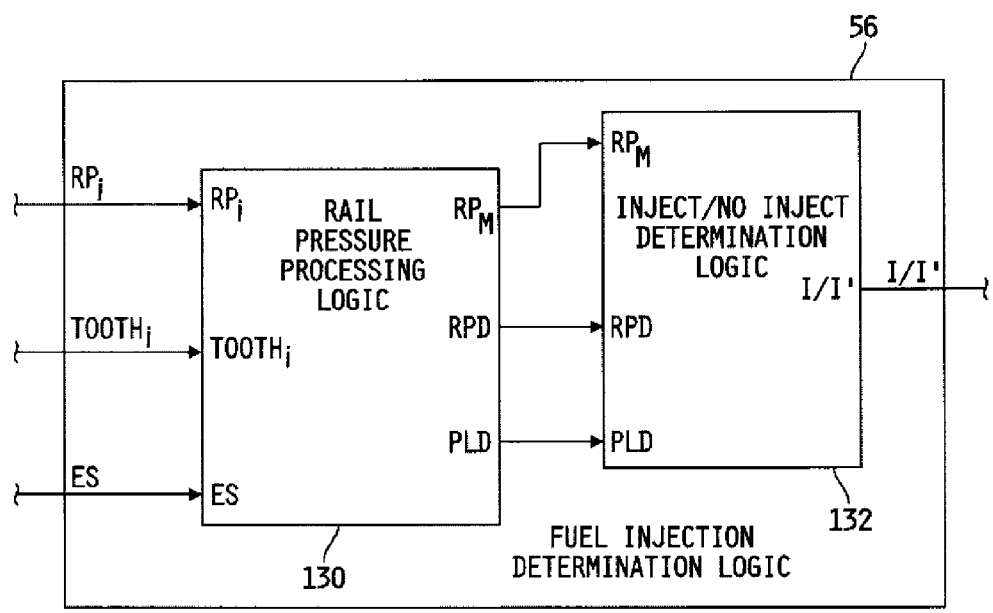
FIG. 6 is a block diagram of one illustrative embodiment of the fuel injection determination logic block of FIG. 3.

Referring now to FIG. 6, one illustrative embodiment of the fuel injection determination logic block 56 of FIG. 3 is shown. In the illustrated embodiment, the fuel injection determination logic block 56 includes a rail pressure processing logic block 130 receiving as inputs the rail pressure and engine speed gear tooth sample values, $RP_i$ and $TOOTH_i$, respectively, as well as the engine speed signal, ES. The rail pressure processing logic block 130 is operable to process these input values, and produce as outputs a rail pressure drop value, RPD, that corresponds to the drop in rail pressure, RP, due to fuel injection by a selected one of the fuel injections $24_1$-$24_N$ during a single engine cycle, a parasitic leakage drop value, PLD, that corresponds to the drop in rail pressure over the single engine cycle when fuel is not being injected by any of the fuel injectors $24_1$-$24_N$, and a mean rail pressure value, $RP_M$, that corresponds to a mean or average rail pressure over the single engine cycle. The RPD, PLD and $RP_M$ values produced by the rail pressure processing logic block 130 are provided as inputs to an inject/no-inject determination logic block 132. The inject/no-inject determination logic block 132 is operable to process these input values and produce as an output an inject/no-inject value (I/I'), which is indicative of whether a discernable amount of fuel has been injected by the selected one of the fuel injectors $24_1$-$24_N$ into a corresponding one of the cylinders $26_1$-$26_N$.

Figure 7:
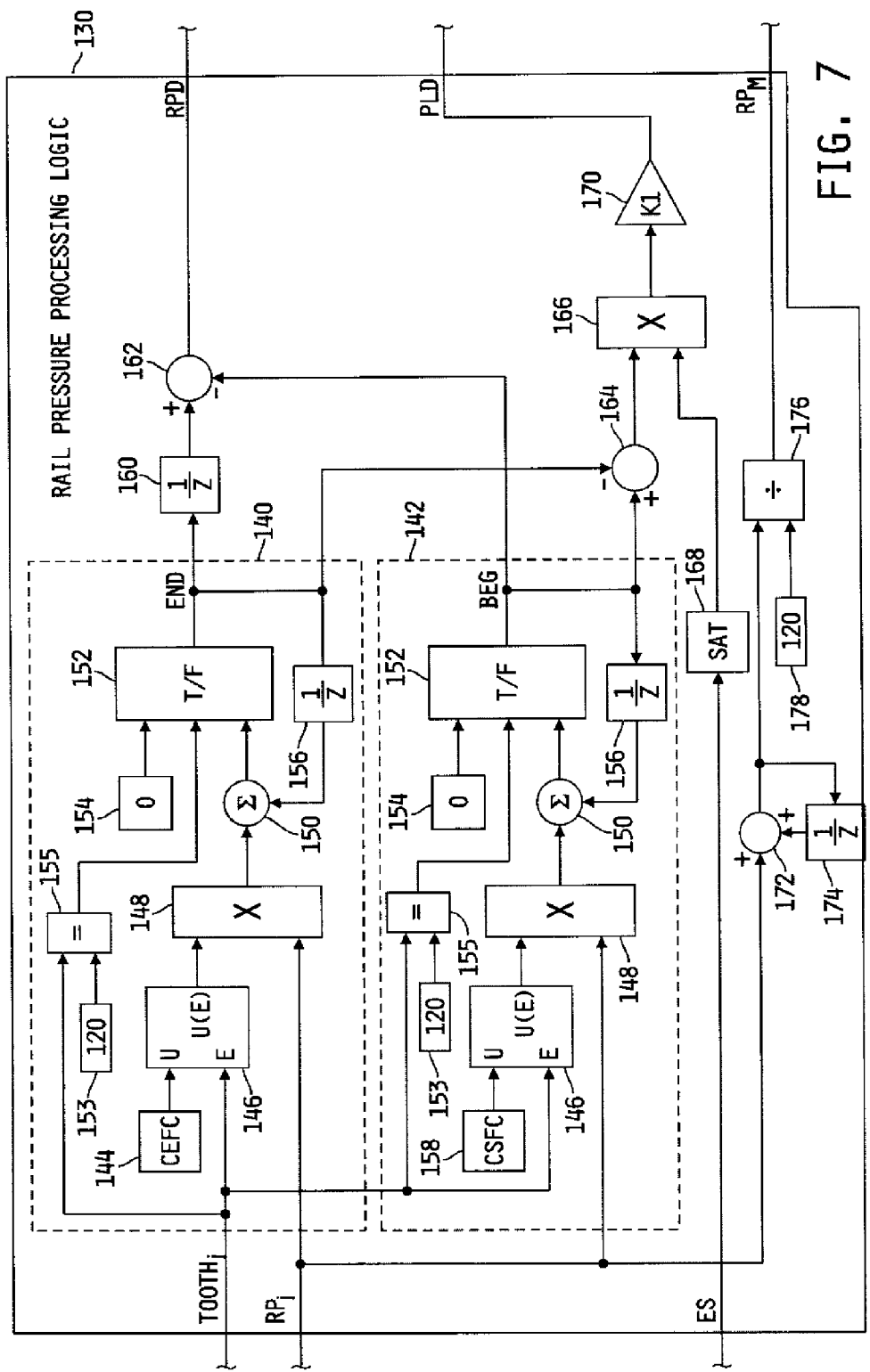
FIG. 7 is a block diagram of one illustrative embodiment of the rail pressure processing logic block of FIG. 6.

Referring now to FIG. 7, one illustrative embodiment of the rail pressure processing logic 130 of FIG. 6 is shown. In the illustrated embodiment, the rail pressure processing logic block 130 includes two filter blocks 140 and 142, as shown by dashed-line representation in FIG. 7. In the illustrated embodiment, the filters 140 and 142 are identical with the exception of the filter coefficients blocks 144 and 158, and are each provided in the form of first-order Savitzky-Golay (SG) filters, although it will be understood that the filters 140 and 142 need not be identical with the exception of filter coefficients, and that either filter 140 or 142 may alternatively be provided in the form of one or more other conventional filters. In the illustrated embodiment, the SG filters are conventional in structure, but are implemented in an unconventional manner that fits linear trends to frames each consisting of a single engine cycle. Illustratively, the rail pressure processing logic block 130 of FIG. 7 operates on each tooth, $TOOTH_i$, of the engine cycle for the selected one of the fuel injectors $24_1$-$24_N$ and produces RPD and PLD values once per engine cycle.

In the embodiment illustrated in FIG. 7, the filter 140 includes a cycle-end filter coefficient (CEFC) block 144 that contains a number of filter coefficients for the cycle-end filter 140. In one embodiment, the CEFC block 144 is an array that holds 120 cycle-end filter coefficients. In this embodiment, the gear or wheel that rotates synchronously with the engine crank shaft, and from which the engine position values, EP, are determined, has 120 teeth. Alternatively, the memory block 144 may be sized to store any number of cycle-end filter coefficients, and in such embodiments the size of the memory block 144 will generally take into account the number of teeth present on the engine speed/position gear or wheel. In any case, the output of the block 144 is provided to one input of a function block 146 having another input that receives the tooth sample values, $TOOTH_i$. The function block 146 is operable to select one of the number of cycle-end filter coefficients, CEFC, based on the current tooth number, $TOOTH_i$, and to produce the selected one of the number of cycle-end filter coefficients, CEFC, at the output of the function block 146. Thus, for example, if $TOOTH_i$ corresponds to tooth number 45, the function block 146 produces as its output the $45^{th}$ cycle-end filter coefficient. In any case, the output of the function block 146 is provided to one input of a multiplication block 148 having another input receiving the rail pressure sample values, $RP_i$. The output of the multiplication block 148 is provided to one input of a summation node 150 having another input receiving the output of a delayed block 156. The output of the summation node 150 is applied to a "false" input of a true/false block 152 having a "true" input receiving the value zero stored in a memory block 154. The tooth samples, $TOOTH_i$, are also provided to one input of an "equals" block 155 having another input receiving a value corresponding to the total number of teeth, e.g., 120, from a memory block 153. The output of the equal block 155 is provided to the control input of the true/false block 152. The output of the equal block 155 is thus a "1" or "true" only when the value of $TOOTH_i$ is equal to the last tooth of the gear or tone wheel of the engine speed and position sensor 38. The output of the true/false block 152 is provided to the input of a delay block 156, to the input of another delay block 160, and to a subtractive input of a summation node 164. The delay block 156 is a one-tooth delay block, so that the output of the delay block 156 changes with each tooth value, $TOOTH_i$. The delay block 160, on the other hand, is an engine cycle delay block, so that the output of the delay block 160 changes once per engine cycle.

In the illustrated embodiment, the filter 142 is identical to the filter 140 just described, with the exception that the cycle-end filter coefficient block 144 is replaced in the filter 142 with a cycle-start filter coefficient block 158 that holds a number, e.g., 120, of a cycle-start or cycle-begin filter coefficients. The output of the true/false block 152 of the filter 142 is provided to a subtractive input of a summation node 162 having an additive input receiving the output of the delay block 160, to an additive input of the summation node 164 and also to an input of a delay block 156. The output of the summation node 162 is the rail pressure drop value, RPD. The output of the summation node 164 is provided to one input of a multiplication block 166 having another input that receives the output of a saturation block 168. The input of the saturation block 168 is the engine speed, ES. The output of the multiplication block 166 is provided to the input of a conversion block 170 that is illustratively operable to convert pressure units of bar/cycle to bar/seconds. In any case, the output of the conversion block 170 is the parasitic leakage drop value, PLD.

The rail pressure sample values, $RP_i$, are also provided to an additive input of a summation node 172 having another additive input that receives the output of a delay block 174. The output of the summation node 172 is provided as an input to the delay block 174 and also as one input to a division block 176 having anther input receiving a value corresponding to the total number of teeth on the gear or tone wheel of the engine speed and position sensor 38, e.g., 120. The output of the division block 176 is the mean rail pressure, $RP_M$, and is in the illustrated embodiment the algebraic average of the sum of the rail pressure sample values, $RP_i$.

Figure 8:
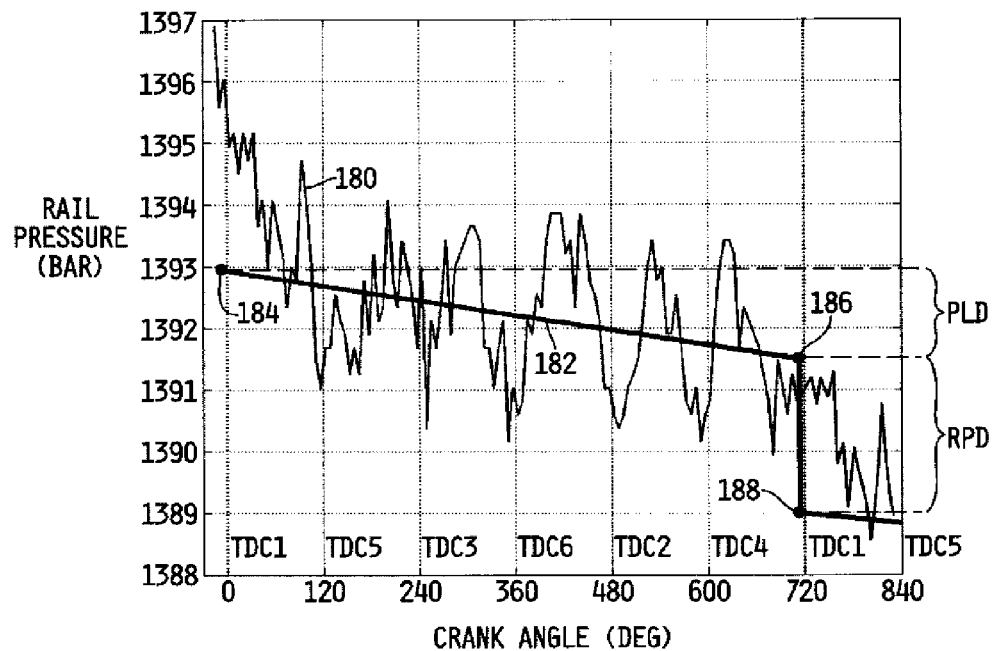
FIG. 8 is a plot of rail pressure vs. engine crank angle illustrating operation of the rail pressure processing logic block of FIG. 7.

Referring now to FIG. 8, a plot of rail pressure vs. engine crank angle 180 is shown illustrating operation of the rail pressure processing logic block 130 of FIG. 7. In FIG. 8, the plot 180 represents the rail pressure, RP, over a single engine cycle, e.g., 720 crank angle degrees, during which a selected one of the fuel injectors $24_1$-$24_N$ is commanded to inject an amount of fuel into a corresponding one of the cylinders $26_1$-$26_N$. As described hereinabove with respect to step 86 of FIG. 4A, the beginning or start of an engine cycle corresponds to the detection of a specified one of the teeth on a gear or tone wheel that is rotating synchronously with the engine crank shaft, and is different for each of the number of cylinders $26_1$-$26_N$ and their corresponding fuel injectors $24_1$-$24_N$. Illustratively, the start of an engine cycle relative to any of the number of cylinders $26_1$-$26_N$ generally corresponds to the so-called top-dead-center (TDC) position of the corresponding piston within the cylinder. With the start of an engine cycle for each of the cylinders $26_1$-$26_N$ so defined, the fuel injection event for each such cylinder occurs at the end of the engine cycle for each cylinder. Thus, the plot 180 of FIG. 8 represents the rail pressure, RP, over a single engine cycle for any one of the fuel injectors $24_1$-$24_N$ that has been commanded to inject an amount of fuel into a corresponding one of the cylinders $26_1$-$26_N$, wherein the engine cycle for any of the corresponding cylinders $26_1$-$26_N$ is understood to begin at the TDC for that cylinder.

The filter 142 of FIG. 7 is configured to detect the rail pressure, RP, at the beginning or start of any engine cycle, and the output of the true/false block 152 of the filter 142, i.e., the value BEG, for the selected one of the fuel injectors $24_1$-$24_N$ over its corresponding engine cycle thus corresponds to the point 184 on the plot of FIG. 8. The filter 140 of FIG. 7 is similarly configured to detect the rail pressure, RP, near the end of any engine cycle at the time that the selected one of the fuel injectors $24_1$-$24_N$ is activated to inject fuel into the engine 28, and the output of the true/false block 152 of the filter 140, i.e., the value END, for the selected one of the fuel injectors $24_1$-$24_N$ over its corresponding engine cycle thus corresponds to the point 186 of the plot 180 of FIG. 8. The output of the summation node 164 at the end of any engine cycle accordingly corresponds to the parasitic leakage drop value, PLD, prior to further processing by the multiplication block 166 and by the conversion block 170. The output of the true/false block 152 of the filter 142, i.e., the value BEG, for the next engine cycle corresponds to the point 188 on the plot of FIG. 8, which also defines the rail pressure, RP, at the end of fuel injection during the previous engine cycle. The end of the previous engine cycle, in the illustrated embodiment, coincides with the deactivation of the selected one of the fuel injectors $24_1$-$24_N$ to thereby stop fuel injection into the engine 28. Thus the point 188 on the plot of FIG. 8 thus corresponds to the value of the rail pressure when the selected one of the fuel injectors $24_1$-$24_N$ is deactivated following activation thereof. The additive input of the summation node 160 is a one engine-cycle delay of the output of the filter 140 and thus corresponds to the point 186 of the plot 180 for the previous engine cycle. The subtractive input of the summation node 160 corresponds to the point 188 of the plot 180 for the next engine cycle, and the difference between the rail pressure values 186 and 188 accordingly represents the rail pressure drop, RPD, due to the injection of fuel into the cylinder of the selected one of the fuel injectors $24_1$-$24_N$. Illustratively, the rail pressure drop values, RPD, and the parasitic leakage drop values, PLD, are both stored in the memory 32.

Figure 9:
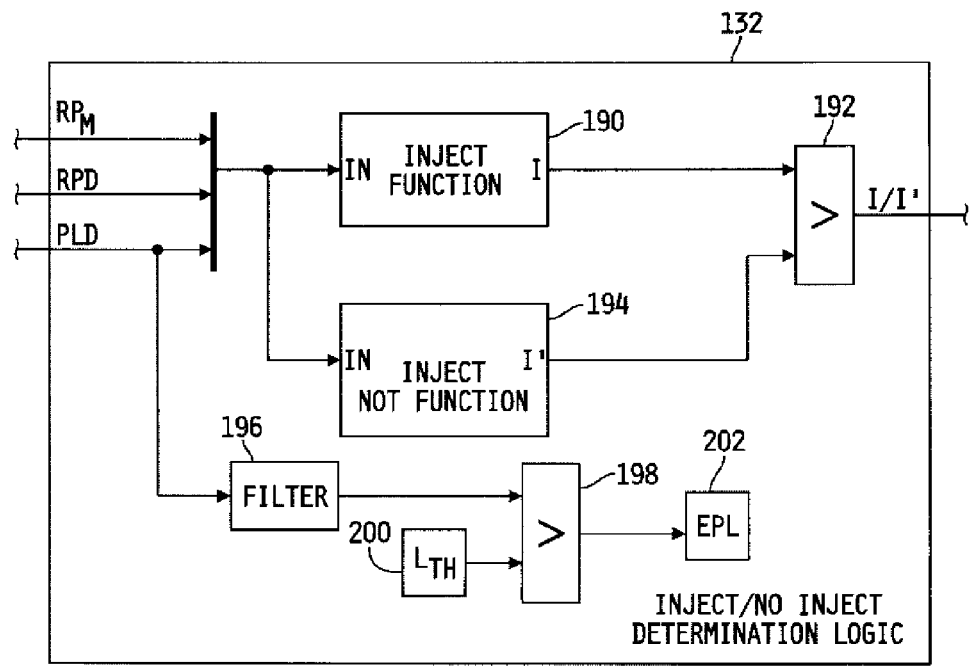
FIG. 9 is a block diagram of one illustrative embodiment of the inject/no inject determination logic block of FIG. 6.

Referring now to FIG. 9, one illustrative embodiment of the inject/no-inject determination logic block of 132 of FIG. 6 is shown. In the illustrated embodiment, the mean rail pressure values, $RP_M$, the rail pressure drop value, RPD, and the parasitic leakage value, PLV, are all provided as inputs to an inject function block 190 and to an inject not function block 194. The output of the inject function block 190 is provided to one input of a "greater than" block 192 having another input receiving the output of the inject not function block 192. The output of the "greater than" block 192 is the I/I' value produced by the fuel injection determination logic block 56 of FIG. 6.

The inject and inject not function blocks 190 and 192 operate to classify the rail pressure drop, RPD, as a fuel injection or a non-fuel injection event using a statistical pattern recognition technique based on discriminant analysis. The discriminant analysis technique classifies the two possible patterns, i.e., inject and inject not, in a manner that minimizes misclassification in a statistical sense. Training data for each class, i.e., inject and inject not, is processed to determine discriminant functions that describe the particular class. In one illustrative embodiment, for example, in which the data is normally distributed, the following discriminant function is used:

$$g_i(x) = -(x-\mu_i)^T S_i^{-1}(x-\mu_i) - \ln[\det(S_i)] \qquad (1),$$

where x is a 1×3 array containing the data $RP_M$, RPD and PLD, $\mu_i$ is a 1×3 array of mean values of the training data set, $S_i$ is a 3×3 sample covariance matrix for the particular class, i.e., inject and inject not, having values that are based on the training data. Equation (1) is illustratively used as the inject function in the block 190 and also as the inject not function in the block 192 where the data array x is provided to the input IN and $g_i(x)$ is the output 1. The values of the mean value array $\mu_i$ and of the sample covariance matrix, $S_i$, are different for each block 190 and 192 as each are generated using different training data. In any case, the discriminant functions used in the function blocks 190 and 191, together with the "greater than" block 192, are operable to classify the rail pressure drop events, RPD, of each engine cycle as an inject event, i.e., fuel has been injected, or an inject not event, i.e., fuel has not been injected. More specifically, the inject function block 190 uses the discriminant function of equation 1 having values of the mean value array $\mu_i$ and of the sample covariance matrix, $S_i$, that were determined using training data specific to detecting injection events, and the inject value, I, produced by the function block 190 corresponds to a likelihood that the activation of the selected fuel injector, $24_K$, for the on-time duration, OT, resulted in injection of fuel by the selected fuel injector, $24_K$, into a corresponding cylinder, $26_K$, of the engine 28. The inject not function block 192 uses the discriminant function of equation 1 having values of the mean value array $\mu_i$ and of the sample covariance matrix, $S_i$, that were determined using training data specific to detecting non-injection events, and the inject-not value, I, produced by the function block 192 corresponds to a likelihood that the activation of the selected fuel injector, $24_K$, for the on-time duration, OT, resulted in no discernable amount of injection of fuel by the selected fuel injector, $24_K$, into a corresponding cylinder, $26_K$, of the engine 28. The inject/no-inject value, I/I', produced by the logic block 132 thus has a value, e.g., "1" or "true," indicating that the selected fuel injector, $24_K$, injected fuel into a corresponding cylinder, $26_K$, of the engine 28 in response to activation of the selected fuel injector, $24_K$, for the on-time duration, OT, if the inject value, I, produced by the function block 190 is greater than the inject-not value, I', produced by the function block 192. Conversely, the inject/no-inject value, I/I', produced by the logic block 132 thus has a value, e.g., "0" or "false," indicating that the selected fuel injector, $24_K$, did not inject fuel into a corresponding cylinder, $26_K$, of the engine 28 in response to activation of the selected fuel injector, $24_K$, for the on-time duration, OT, if the inject value, I, produced by the function block 190 is less than or equal to the inject-not value, I', produced by the function block 192.

The inject/no-inject determination logic block of 132 further includes a filter block 196 having an input that receives the parasitic leakage drop values, PLD, and an output that is provided to one input of a "greater than" block 198. The filter block 196 is illustratively a conventional filter that produces a filtered PLD value over time. The filtered value of PLD over time may represent, for example, a time-delayed, time-averaged, peak-detected or other time-filtered PLD value. In any case, a second input of the "greater than" block 198 receives a leakage threshold value, $L_{TH}$, that is stored in a memory location 200. The output of the "greater than" block is provided as an input to a memory location 202 having an excessive parasitic leakage value, EPL, stored therein. Illustratively, the default value of EPL is zero, but if the filtered parasitic leakage drop output of the filter block 196 becomes greater than the leakage threshold, $L_{TH}$, the "greater than" block 198 sets the excessive parasitic leakage value, EPL, to a "1" or "true," thereby indicating that an excessive parasitic fuel leakage condition exists. EPL is reset to "0" or "false" when the filtered parasitic leakage drop output of the filter block 196 drops to or below $L_{TH}$, and/or by manually resetting the EPL value in the memory location 202.

Figure 10:
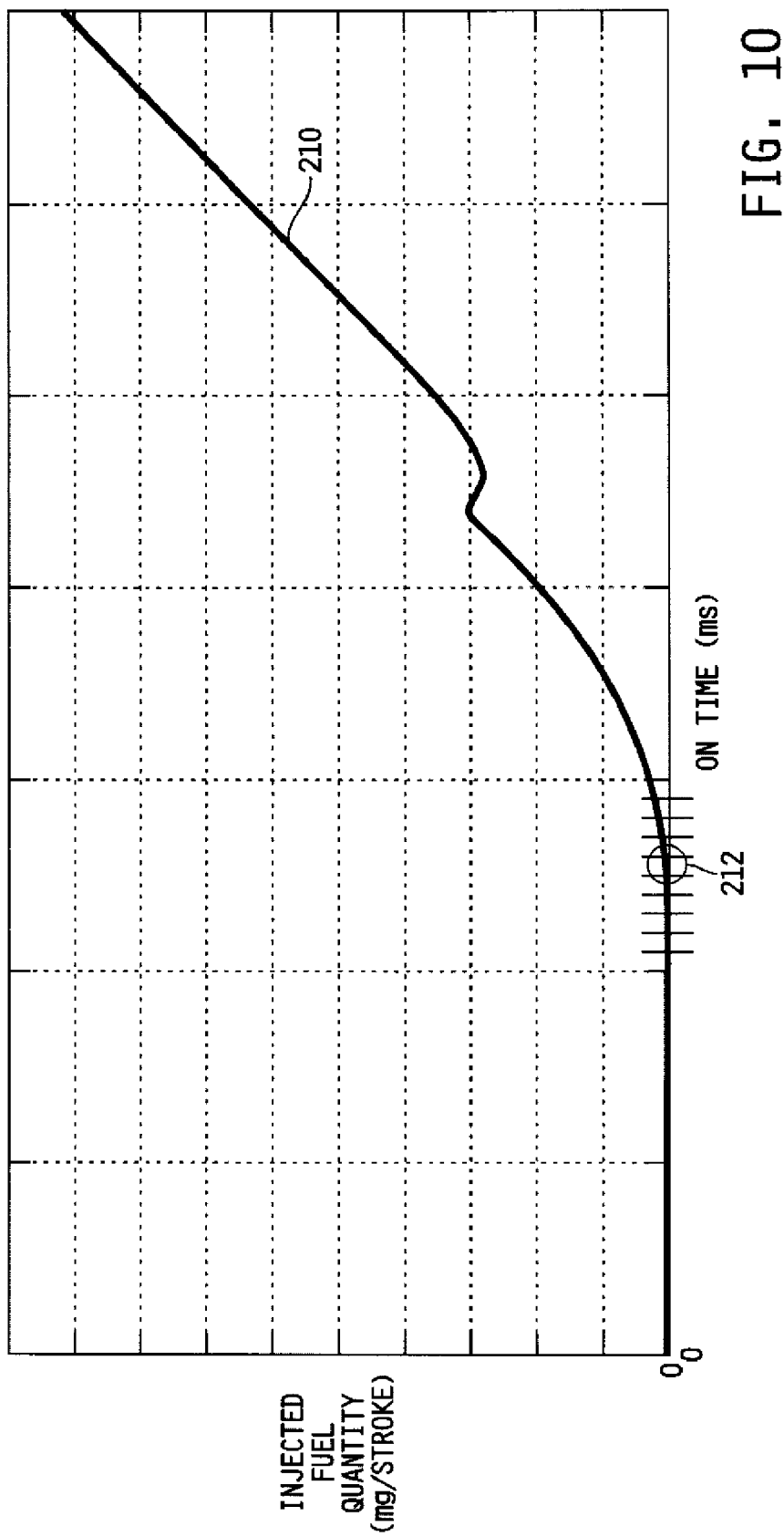
FIG. 10 is a plot of injected fuel quantity vs. injector on-time for a single fuel injector illustrating it's critical on-time.

Referring now to FIG. 10, a plot 210 of injected fuel quantity (mg/stroke, arbitrary scale) vs. injector on-time (milliseconds, arbitrary scale) for a single fuel injector is shown illustrating it's critical on-time. As illustrated in FIG. 10, a discernable amount of injected fuel occurs in an on-time region 212 during which the injected fuel quantity 210 rises above zero. As illustrated by the periodic vertical lines on either side of the critical on-time 212, the main control logic block 54 may use any conventional incrementing, decrementing and/or "hunting" technique to determine the actual critical on-time 212.

Figure 11:
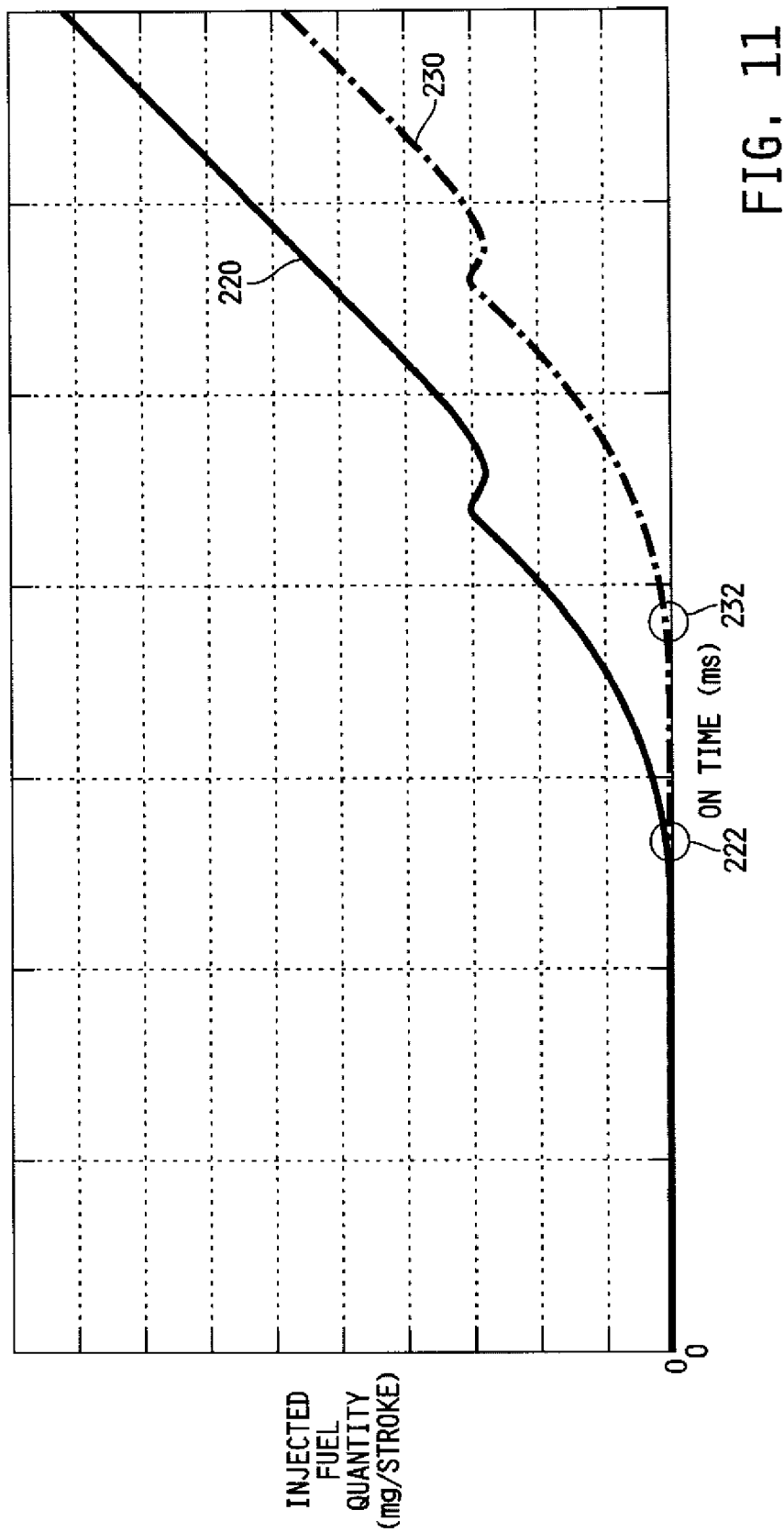
FIG. 11 is a plot of injected fuel quantity vs. injector on-time for a normally functioning fuel injector and for a failed fuel injector illustrating corresponding variations in observed critical on-times.

Referring now to FIG. 11, plots 220 and 230 of injected fuel quantity (mg/stroke, arbitrary scale) vs. injector on-time (milliseconds, arbitrary scale) are shown for a normal, i.e., base-line, fuel injector, corresponding to the plot 220, and a failed fuel injector, corresponding to the plot 230. In the illustrated example, the critical on-times for the two fuel injectors generally exhibit discernibly different on-time values. Such differences in critical on-times generally lead to variations in fueling by the two represented fuel injectors, and monitoring the critical on-times thus provides a mechanism for monitoring the overall health of the various fuel injectors $24_1$-$24_N$ and further provides a basis for a mechanism for dynamically compensating the commanded injector on-times, OT, of the fuel injectors $24_1$-$24_N$ to ensure that all of the fuel injectors $24_1$-$24_N$ inject substantially the same amount of fuel.

Figure 12:
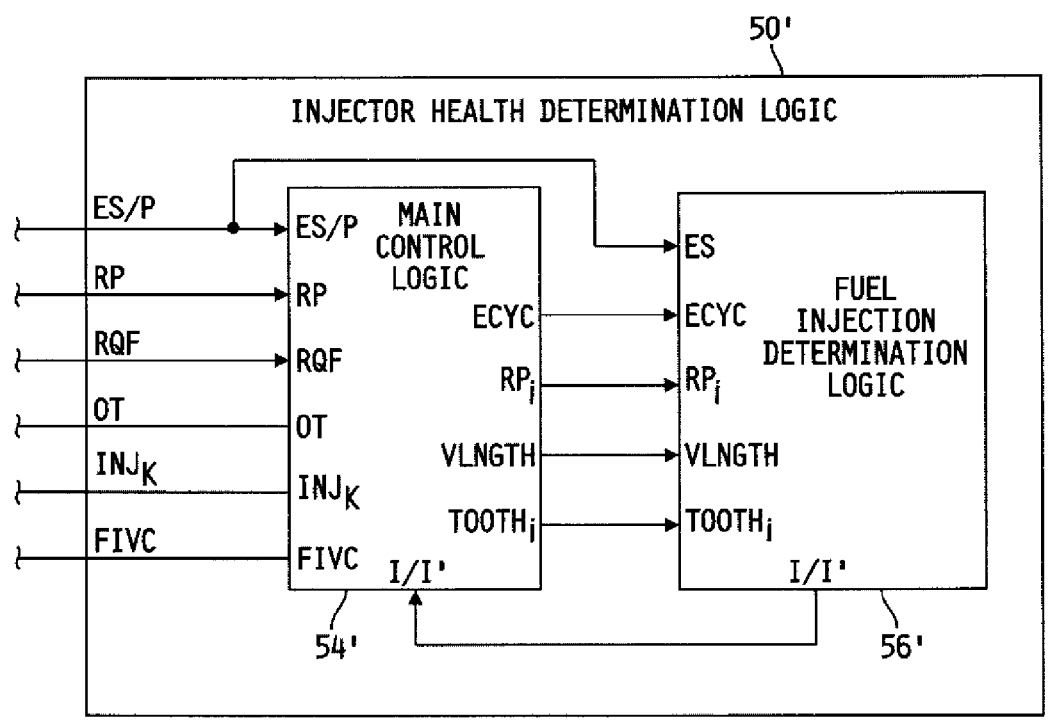
FIG. 12 is a block diagram of another illustrative embodiment of the injector health determination logic block of FIG. 2.

Referring now to FIG. 12, another illustrative embodiment 50' of the injector health determination logic block 50 of FIG. 2 is shown. In the illustrated embodiment, the injector health determination block 50' includes a main control logic block 54' and a fuel injection determination logic block 56'. The main control logic block 54' is similar to the main control logic block 54 illustrated and described herein with respect to FIG. 3 in that it receives as inputs the engine speed and position signal, ES/P, the rail pressure signal, RP, the requested fueling value, RQF, and inject/no-inject value, I/I' that is produced by the fuel injection determination logic block 56', and that it produces as outputs the on-time value, OT, the injector identification value, $INJ_K$, and the fuel inlet metering value command value, FIVC, the instantaneous rail pressure value, $RP_i$, and a corresponding individual tooth number, $TOOTH_i$. The main control logic block 54' of FIG. 12 further produces as outputs an engine cycle value, ECYC, which is a count value that corresponds to the current number of engine cycles for which a selected one of the fuel injectors $24_1$-$24_N$ has been commanded to inject fuel into a corresponding one of the cylinders $26_1$-$26_N$, and a VLNGTH value that corresponds to a predetermined number of engine cycles for which a selected one of the fuel injectors $24_1$-$24_N$ will be commanded to inject fuel into a corresponding one of the cylinders $26_1$-$26_N$. The fuel injection determination logic block 56' is likewise similar to the fuel injection determination logic block 56 of FIG. 3 in that is receives as inputs the engine speed value, ES, which is taken from the engine speed and position signal, ES/P, the instantaneous rail pressure value, $RP_i$, produced by the main control logic block 54', and the corresponding individual tooth number, $TOOTH_i$, that is produced by the main control logic block 54', and produces as an output the I/I' value that is provided to the main control logic block 54'. The fuel injection determination logic block 56' further receives as inputs from the main logic control logic block 54' the ECYC and VLNGTH values just described.

Figure 13:
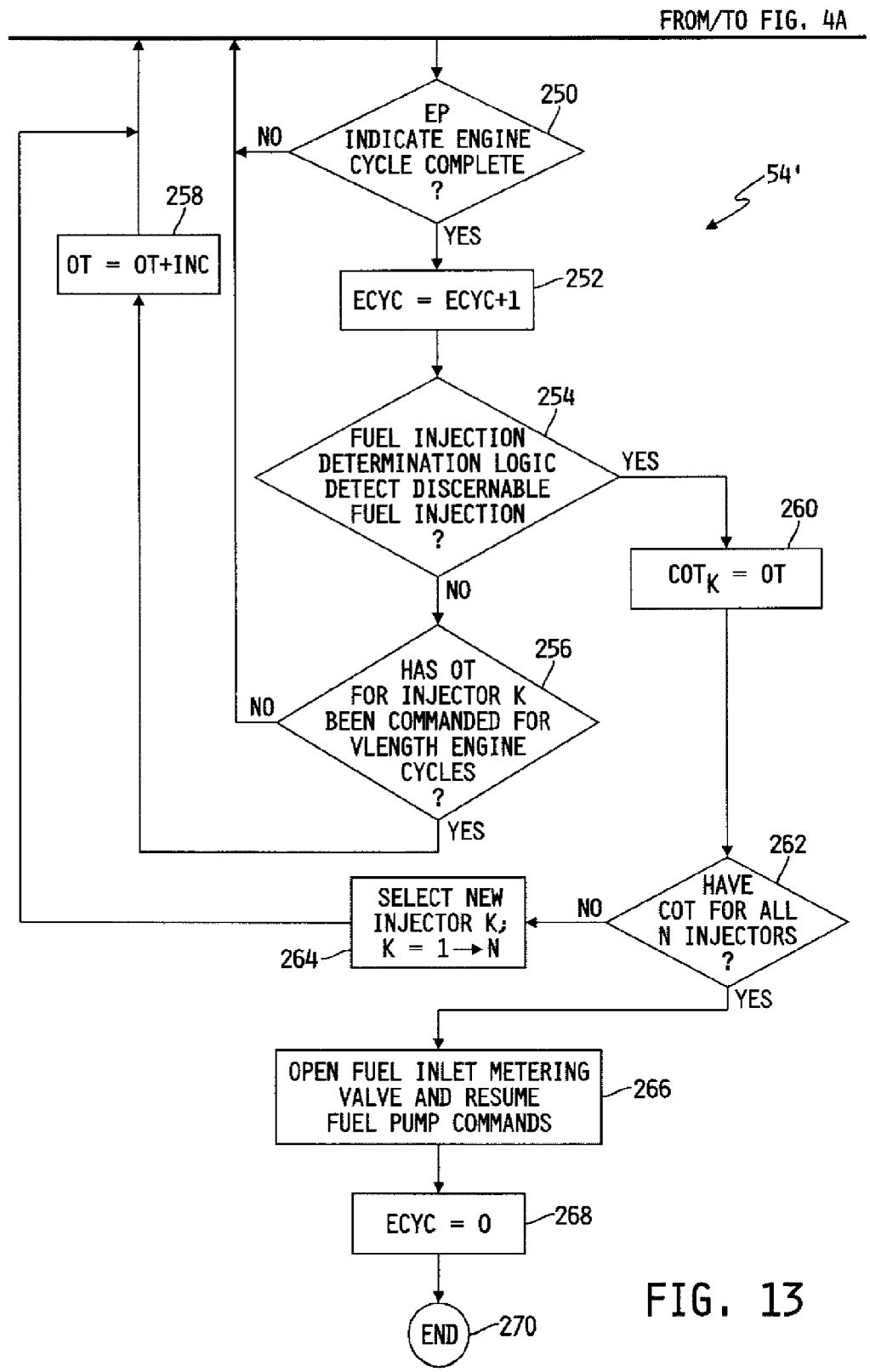
FIG. 13 is a flowchart of one illustrative embodiment of a portion of the main control logic block of FIG. 12.

Referring now to FIG. 13, a flow chart of one illustrative embodiment of a software algorithm representing a portion of the main control logic block 54' of FIG. 12 is shown. In the illustrated embodiment, the software algorithm of FIG. 13 utilizes the portion of the software algorithm 54 illustrated and described hereinabove with respect to FIG. 4A. The portion of the software algorithm 54 illustrated in FIG. 4A and the software algorithm illustrated in FIG. 13 together form a software algorithm 54' that defines the illustrative embodiment of the main control logic block 54'. The software algorithm 54' may illustratively be stored in the memory unit 32 in the form of instructions that are executable by the control circuit 30 to control the fuel system of FIG. 1 as will be described hereinafter.

The injector health determination logic block 50' of FIG. 12 generally differs from the injector health determination block 50 of FIG. 3 in that the injector health determination block 50' includes additional logic that evaluates the Inject/No-Inject values, I/I', produced by the Inject/No-Inject determination logic block 132 in response to a constant injector on-time command (OT) over a plurality of engine cycles to determine whether a discernable amount of fuel has been injected by a selected one of the fuel injectors $24_1$-$24_N$ into a corresponding one of the number of cylinders $26_1$-$26_N$ of the engine 28. In this regard, step 90 of FIG. 4A advances, in the embodiment illustrated in FIG. 13, to step 250 where the main control logic block 54' is operable to determine from the current engine position, EP, whether the current engine cycle is complete. If not, execution of the algorithm 54' loops back to step 86. If, on the other hand, the main control logic block 54' determines at step 250 that the current engine cycle is complete, the algorithm 54' advances to step 252 where the main control logic block 54' is operable to increment an engine cycle counter, ECYC, by one. Prior to execution of the algorithm 54', ECYC will be set to zero as will be described below.

Following step 252, execution of the algorithm 54' advances to step 254 where the main control logic block 54' is operable to determine whether the fuel injection determination logic 56' has detected discernable fuel injection, i.e., a discernable amount of fuel injected, by the currently selected (Kth) one of the fuel injectors $24_1$-$24_N$. One illustrative embodiment of the fuel injection determination logic 56' that is operable to execute step 254 will be described in detail hereinafter with respect to FIGS. 14 and 15. If, at step 254, the fuel injection determination logic 56' has not detected discernable fuel injection, execution of the algorithm 54' advances to step 256 where the control circuit 30 is operable to determine whether the currently commanded on-time, OT, for the Kth one of the fuel injectors $24_1$-$24_N$ has been commanded for a predetermined number of engine cycles, VLNGTH. In the illustrated embodiment, VLNGTH corresponds to the total number of engine cycles over which the fuel injection determination logic block 56' may detect no discernable fuel injection before changing, e.g., incrementing, the commanded on-time value, OT. The value of VLNGTH is arbitrary, and may be programmed in the memory unit 32. In one illustrative embodiment, for example, VLNGTH may vary between 1 and 100, although other values of VLNGTH are contemplated.

In any case, if the main control logic block 54' determines at step 256 that the currently commanded on-time, OT, for the Kth one of the fuel injectors $24_1$-$24_N$ has not been commanded for a VLNGTH engine cycles, the algorithm 54' loops back to step 86 of FIG. 4A. If, on the other hand, the main control logic block 54' determines at step 256 that the currently commanded on-time, OT, for the Kth one of the fuel injectors $24_1$-$24_N$ has been commanded for a VLNGTH engine cycles, the algorithm 54' advances to step 258 where the control circuit 30 is operable to modify the currently commanded on-time value, OT, e.g., by incrementing OT by an increment value, INC, as described hereinabove respect to step 98 of FIG. 4B. Alternatively, the control circuit 30 may be operable at step 258 to modify the currently commanded on-time, OT, using any of the alternative techniques described hereinabove with respect to FIG. 4B. In any case, execution of the algorithm 54' loops from step 258 back to step 80 of FIG. 4A to monitor the current engine position value, EP.

If, at step 254, the fuel injection determination logic 56' has detected discernable fuel injection, the algorithm advances to step 260 where the main control logic block 54' is operable to set the critical on-time value, $COT_K$, for the Kth one of the fuel injectors $24_1$-$24_N$ to the value of the currently commanded on-time, OT, and to store the critical on-time value, $COT_K$, along with the injector identifier, K, in the memory unit 32, as described hereinabove with respect to step 96 of FIG. 4B. Following step 260, the main control logic block 54' is operable at step 262 to determine whether critical on-time values, COT, have been determined for all of the injectors $24_1$-$24_N$. If not, the algorithm 54' advances to step 264 where the main control logic block 54' is operable to select a new injector K from the remaining ones of the injector $24_1$-$24_N$ for which a critical on-time value, COT, has not been determined. From step 264, the algorithm 54' loops back to step 80 of FIG. 4A. If, at step 262, the main control logic block 54' determines that critical on-time values, COT, have been determined for all of the injectors $24_1$-$24_N$, the algorithm 54' advances to step 266 where the main control logic block 54' is operable to produce a fuel inlet metering valve command value, FIVC, that corresponds to an open fuel inlet metering valve 16. The fueling logic block 50 is responsive to the fuel inlet metering valve command value, FIVC, produced by the injector health determination logic block 50' to command the fuel inlet metering valve 16 to an open position and to resume fuel pump commands to a fuel pump 18. The algorithm 54' advances from step 266 to step 268 where the main control logic block 54' is operable to reset the engine cycle counter, ECYC, e.g., by setting ECYC to zero. The algorithm 54' advances from step 268 to step 270 where execution of the algorithm 54' ends.

Figure 14:
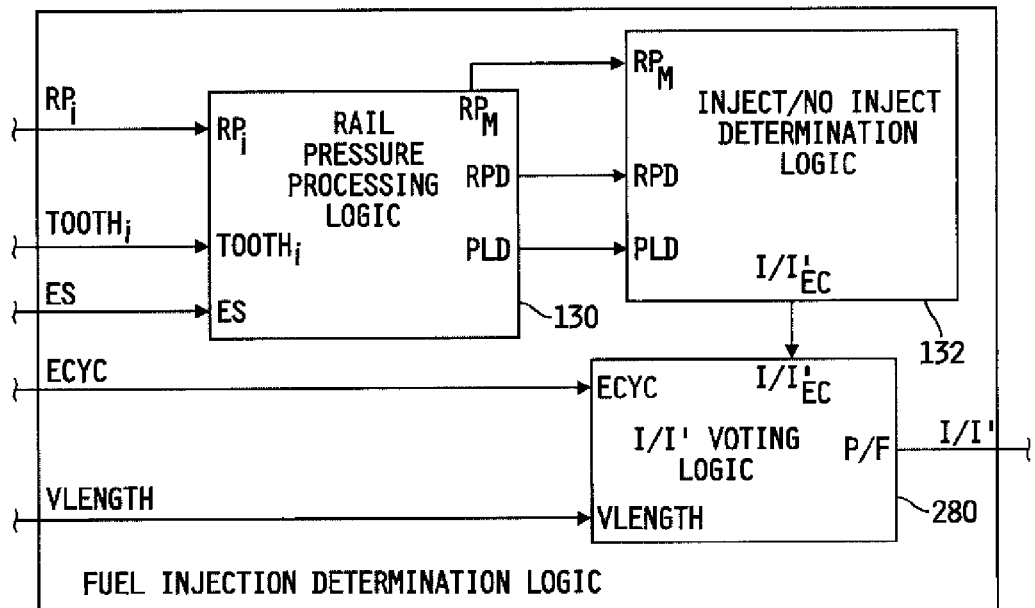
FIG. 14 is a block diagram of one illustrative embodiment of the fuel injection determination logic block of FIG. 12.

Referring now to FIG. 14, one illustrative embodiment of the fuel injection determination logic block 56' of FIG. 12 is shown. In the illustrated embodiment, the fuel injection determination logic block 56' includes the rail pressure determination logic block 130 illustrated and described hereinabove with respect to FIGS. 6 and 7, and also the Inject/No-Inject determination logic block 132 illustrated and described hereinabove with respect to FIGS. 6 and 9. The rail pressure determination logic block 130 is operable, as described hereinabove, to process rail pressure samples in a manner that produces rail pressure drop values that correspond to fuel injection events and to fuel leakage during non-injection periods during each engine cycle. The Inject/No-Inject determination logic block 132 is operable, as described hereinabove, to process the rail pressure drop values in a manner that produces an Inject/No-Inject value that corresponds to a determination of whether a discernable amount of fuel was injected by the currently selected (Kth) one of the fuel injectors $24_1$-$24_N$ during the current engine cycle. To emphasize that the Inject/No-Inject value produce by the Inject/No-Inject determination logic block 56' is a value that is determined and produced each engine cycle, the Inject/No-Inject output of the Inject/No-Inject determination logic block 132 is labeled I/I'$_{EC}$ in FIG. 14.

The fuel injection determination logic block 56' also includes an Inject/No-Inject (I/I') voting logic block 280 that receives the engine cycle count value, ECYC, the total engine cycle value, VLNGTH, from the main control logic block 54', and the per-engine cycle Inject/No-Inject value, I/I'$_{EC}$, from the Inject/No-Inject determination logic block 132. The I/I' voting logic block 280 is generally operable, as briefly described above, to evaluate the per-engine cycle Inject/No-Inject values, I/I'$_{EC}$, over a number of engine cycles, e.g., VLNGTH engine cycles, and to produce the Inject/No-Inject value, I/I', based on this evaluation. Generally, I/I' will have one logic value, e.g., "1" or logic high, if the I/I' voting logic block 280 determines over the number of engine cycles that a discernable amount of fuel injection has occurred, and to produce an opposite logic value, e.g., "0" or logic low, if the I/I' voting logic block 280 otherwise determined that a discernable amount of fuel injection has not occurred. It will be understood, that these logic states may alternatively be reversed.

Figure 15:
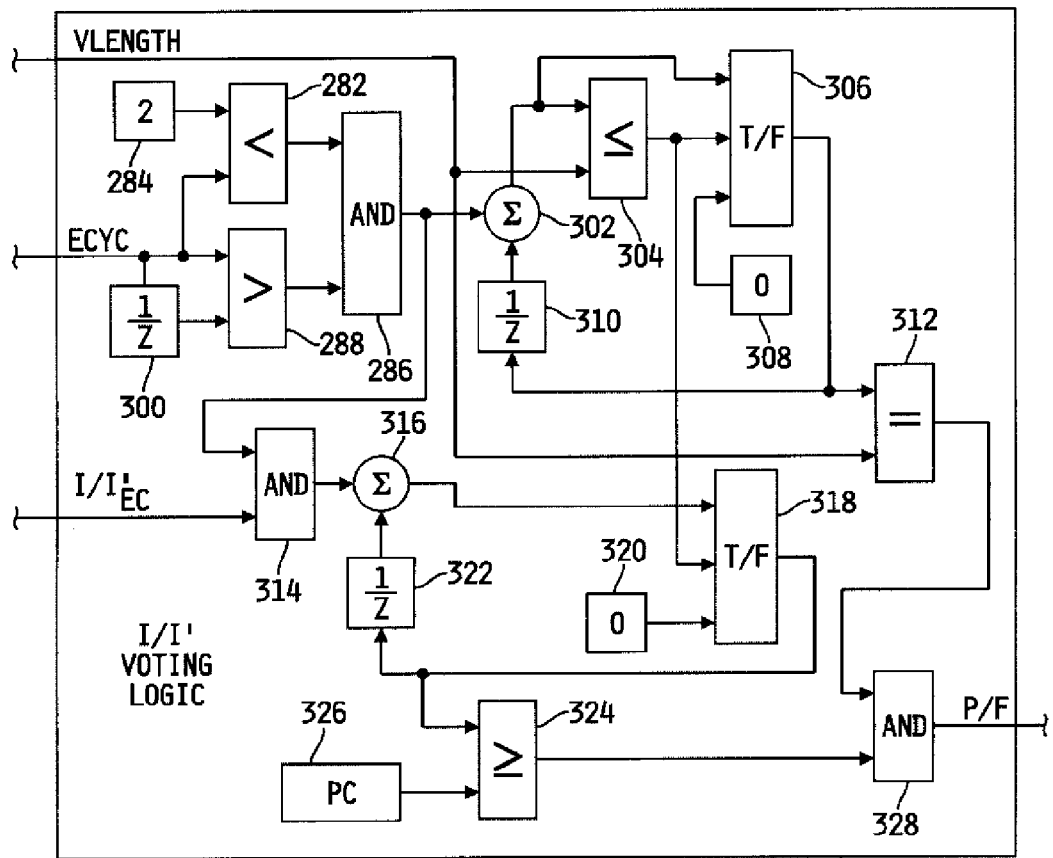
FIG. 15 is a block diagram of one illustrative embodiment of the inject/no inject voting logic block of FIG. 14.

Referring now to FIG. 15, one illustrative embodiment of the I/I' voting logic block 280 forming part of the fuel injection determination logic block 56' of FIG. 14 is shown. In the illustrated embodiment, the I/I' voting logic block 280 includes a "less than" logic block 282 having one input receiving the value "2" stored in a storage location 284 of the memory unit 32, and having another input receiving the engine cycle count value, ECYC. The output of the "less than" block 282 is provided as one input to an AND logic block 286 having another input that receives the output of a "greater than" block 288. The "greater than" block 288 has one input that receives ECYC, and another input that receives the output of a delay block 300 having an input that also receives the engine cycle count value, ECYC. The delay block 300 illustratively delays the ECYC value by one engine cycle so that the "greater than" block 288 produces a "1" or logic high value as long as the current value of ECYC is greater that ECYC of the previous engine cycle, and otherwise produces a "0" or logic low value. The "less than" block 282 produces a "1" or logic high value as long as the value stored in the memory location 284, e.g., 2, is less than ECYC, and is otherwise a "0" or logic low value. The AND block 286 thus produces a "1" or logic high value as long as the current engine cycle is greater than two and ECYC is increasing, and otherwise produces a "0" or a logic low value.

The I/I' voting logic block 280 further includes a summation node 302 having one input receiving the output of the AND block 286, and another input receiving the output of a delay block 310. The output of the summation node 302 is provided to one input of a "less than or equal to" logic block 304 having another input receiving the VLNGTH value. The output of the summation node 302 is also provided to a "true" input of a true/false block 306 having a "false" input receiving a value, e.g., zero, stored in a memory location 308. The control input of the true/false block 306 receives the output of the "less than or equal to" block 304, and the output of the true/false block 306 is provided to the input of the delay block 310 and also to one input of a "equals" logic block 312. Another output of the "equals" block 312 receives the VLNGTH value. The delay block 310 is illustratively configured to delay the value provided thereby to the summation block by one engine cycle. The "less than or equal to" block 304 is configured to produce a "1" or logic high value as long as the value produced by the summation node 310 is less than or equal to VLNGTH, and otherwise produces a "0" or logic low value. The logic blocks 302-312 are configured such that the output of the true/false block 306 represents the count of engine cycles, when ECYC is greater than 2, between 1 and VLNGTH. While this count value is less than VLNGTH, the output of the "equals" block is a "0" or logic low value. However, when the count value at the output of the true/false block 306 reaches VLNGTH, the output of the "equals" block 312 transitions to a "1" or logic high value.

The output of the AND block 286 is also provided to one input of another AND logic block 314 having another input receiving the per-engine cycle Inject/No-Inject value, $I/I'_{EC}$, produced by the Inject/No-Inject determination logic block 132. The output of the AND block 314 is provided to one input of a summation node 316 having another input receiving the output of a delay block 322. The output of the summation node 316 is provided to a "true" input of a true/false block 318 having a "false" input receiving a value, e.g., zero, stored in a memory location 320. The control input of the true/false logic block 318 is provided by the output of the "less than or equal to" block 304. The output of the true/false block 318 is provided as an input to the delay block 322 and also as an input to a "greater than or equal to" logic block 324 having another input receiving a pass count value, PC, stored in a memory location 326. The "greater than or equal to" block 324 is operable to produce a "1" or logic high value if the output of the true/false block 318 is greater than the pass count value, PC, and is operable to otherwise produce a "0" or logic low value. The output of the "greater than or equal to" block 324 is provided to one input of an AND logic block 328 having another input receiving the output of the "equals" block 312. The output of the AND block 328 is the Pass/Fail (P/F) output of the I/I'voting logic block 280. Generally, if the I/I'voting logic block 280 determines that a discernable amount of fuel injection by the Kth one of the fuel injectors $24_1$-$24_N$, the Pass/Fail output is "Pass" and is otherwise "Fail." Illustratively, a "Pass" is represented by a logic high value or "1," and a "Fail" is represented by a logic low value or "0," although the block 280 may alternatively be configured such that the "Pass" and "Fail" values are represented by logic low values and logic high values respectively.

The delay block 322 is illustratively configured to delay the value provided thereby to the summation block by one engine cycle. The logic blocks 314-322 are configured such that the output of the true/false block 318 is a vote number that represents the count of $I/I'_{EC}$ values that are "1" or logic high. While this vote number or count value is less than PC, the output of the "greater than or equal to" block 324 is a "0" or logic low value, thereby indicating selected fuel injector, $24_K$, did not inject a discernable amount of fuel into the engine 28 in response to activation of the selected fuel injector, $24_K$, for the on-time duration, OT. However, when the vote number of count value at the output of the true/false block 318 reaches at least the value of PC, the output of the "greater than or equal to" block 324 transitions to a "1" or logic high value, thereby indicating that the selected fuel injector, $24_K$, injected fuel into the engine 28 in response to activation of the selected fuel injector, $24_K$, for the on-time duration, OT. Illustratively, the pass count value, PC, is a programmable value that represents a count of $I/I'^{EC}$ "1" or logic high values at or above which the I/I' voting logic 280 considers a discernable fuel injection by the currently selected (Kth) one of the fuel injectors $24_1$-$24_N$ to have occurred. When the output of the true/false block 306 reaches the value of VLNGTH, the output of the "equals" block 312 transitions to a "1" or logic high, and the P/F value produced by the AND gate 328 when this occurs thus reflects the status of the comparison of the count value produced by the true/false block 318 and PC. Alternatively, the I/I' voting logic block 280 may be configured to produce a logic high or "1" P/F value if the number of engine cycles that $I/I'_{EC}$ is "1" or a logic high value is greater than PC regardless of whether the total number of engine cycles has reached VLNGTH. Modifications to the I/I' voting logic block 280 to effectuate this alternative embodiment would be a mechanical step for a skilled artisan. In any case, the I/I' voting logic block 280 is operable to count the number of times that the Inject/No-inject value $I/I'_{EC}$, determined and produced by the Inject/No-Inject determination logic block 132 each engine cycle, indicates that discernable fuel injection by the currently selected (Kth) one of the fuel injectors $24_1$-$24_N$ was detected, to compare this count to a programmable count value, PC, and to determine that a discernable amount of fuel was injected into the engine 28 by the currently selected one of the fuel injectors $24_1$-$24_N$ if the count reaches or exceeds PC. In the former case, the I/I' voting logic block 280 is operable to carry out this process VLNGTH times, and in the latter case the I/I'voting logic block 280 is operable to carry out this process until the first to occur of the count reaching PC or VLNGTH times.

Figure 16:
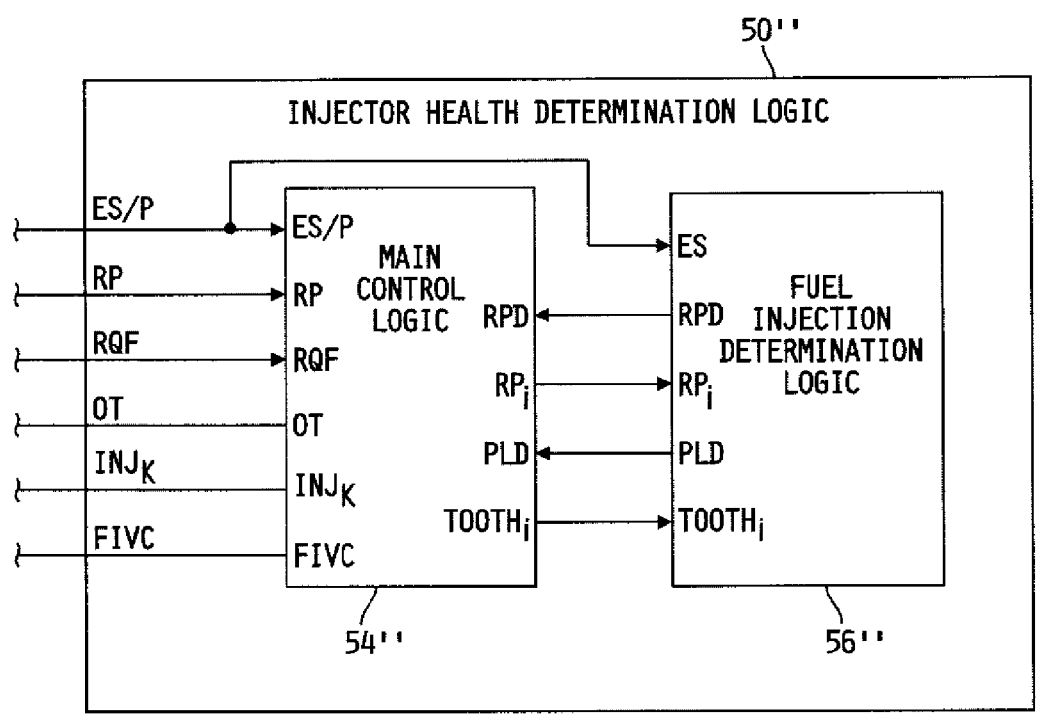
FIG. 16 is a block diagram of yet another illustrative embodiment of the injector health determination logic block of FIG. 2.

Referring now to FIG. 16, another illustrative embodiment 50'' of the injector health determination logic block 50 of FIG. 2 is shown. In the illustrated embodiment, the injector health determination block 50'' includes a main control logic block 54'' and a fuel injection determination logic block 56''. The main control logic block 54'' is similar to the main control logic block 54 illustrated and described herein with respect to FIG. 3 in that it receives as inputs the engine speed and position signal, ES/P, the rail pressure signal, RP, and the requested fueling value, RQF, and that it produces as outputs the on-time value, OT, the injector identification value, $INJ_K$, the fuel inlet metering value command value, FIVC, the instantaneous rail pressure value, $RP_i$, and a corresponding individual tooth number, $TOOTH_i$. The main control logic block 54' of FIG. 12 further receives as inputs the rail pressure drop value, RPD, and the parasitic drop value, PLD, that are determined by the fuel injection determination logic block 56'' as described hereinabove. The fuel injection determination logic block 56'', in this embodiment, need only include the rail pressure processing logic block 130, and it therefore does not have an Inject/No-Inject output. Likewise, the main control logic block 54'' does not, in this embodiment, include an Inject/No-Inject input.

Figure 17:
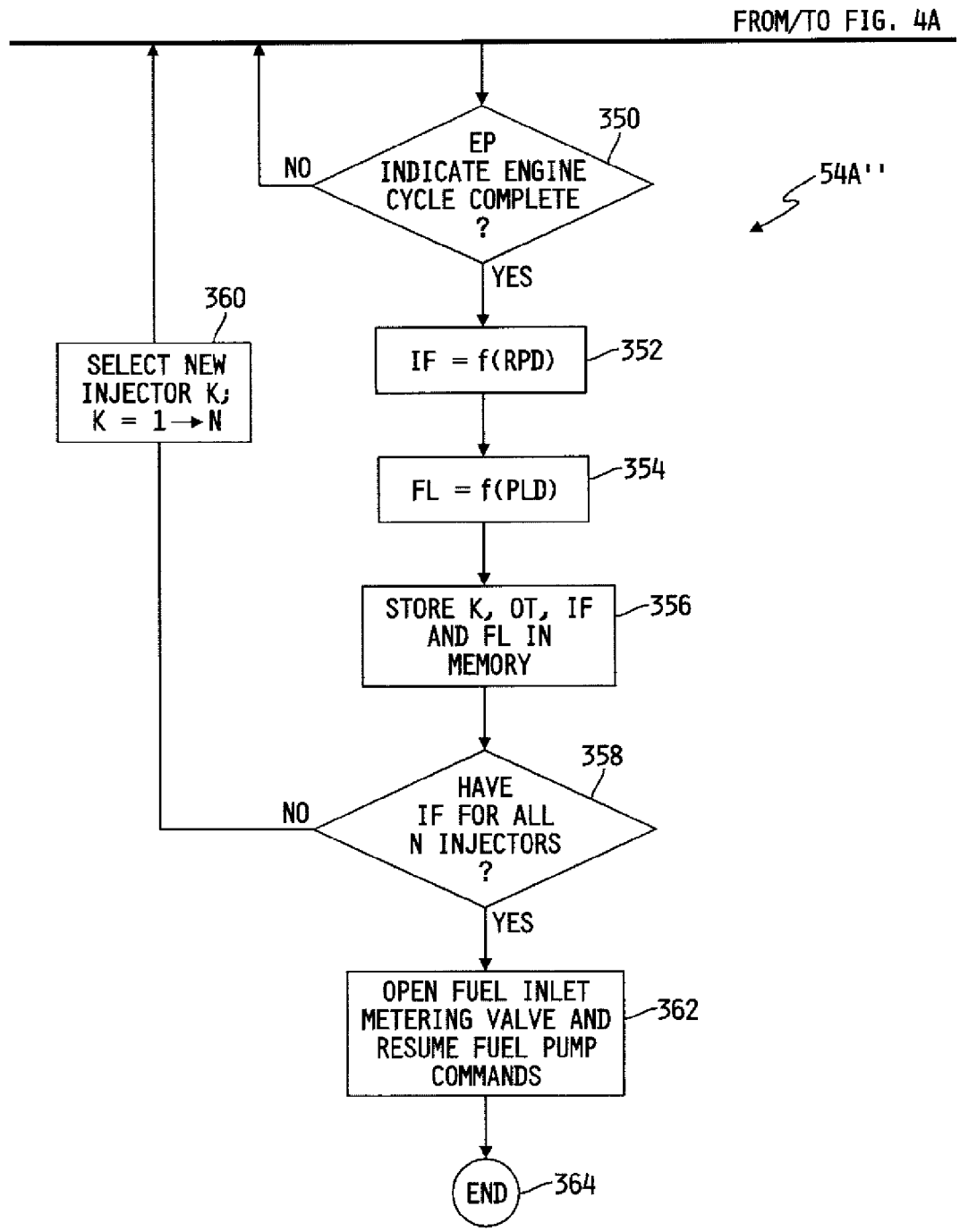
FIG. 17 is a flowchart of one illustrative embodiment of a portion of the main control logic block of FIG. 16.

Referring now to FIG. 17, a flow chart of one illustrative embodiment of a software algorithm representing a portion of the main control logic block 54'' of FIG. 16 is shown. In the illustrated embodiment, the software algorithm of FIG. 17 utilizes the portion of the software algorithm 54 illustrated and described hereinabove with respect to FIG. 4A. The portion of the software algorithm 54 illustrated in FIG. 4A and the software algorithm illustrated in FIG. 17 together form a software algorithm 54A" that defines the illustrative embodiment of the main control logic block 54". The software algorithm 54" may illustratively be stored in the memory unit 32 in the form of instructions that are executable by the control circuit 30 to control the fuel system of FIG. 1 as will be described hereinafter.

The injector health determination logic block 50" of FIG. 16 generally differs from the injector health determination blocks 50 of FIGS. 3 and 50' of FIG. 12 in that the injector health determination block 50'" is configured to estimate amounts of fuel injected by each of the fuel injectors $24_1$-$24_N$, e.g., in units of mg/stroke or other known units of fuel injection, as a function of the rail pressure drop values, RPD, to estimate fuel leakage amounts during non-injection times as a function of the parasitic leakage drop values, PLD, and to store these and other associated information in memory. In this regard, step 84 of FIG. 4A is modified in the embodiment of the algorithm 54A" such that the on-time value, OT, is selected to be an on-time value that will result in a discernable quantity of fuel being injected by the currently selected one of the fuel injectors $24_1$-$24_N$ into the engine 28. Accordingly, no Inject/No-Inject logic is necessary in this embodiment as at least some discernable amount of fuel will be injected during each engine cycle.

In the embodiment illustrated in FIG. 17, step 90 of FIG. 4A advances to step 350 where the main control logic block 54" is operable to determine from the current engine position, EP, whether the current engine cycle is complete. If not, execution of the algorithm 54A" loops back to step 86. If, on the other hand, the main control logic block 54" determines at step 350 that the current engine cycle is complete, the algorithm 54A" advances to step 352 where the main control logic block 54" is operable to determine an injected fuel quantity, IF, corresponding to an estimate of the amount of fuel injected into the engine 28 by the currently selected (Kth) one of the fuel injectors $24_1$-$24_N$ during the current engine cycle, as a function of the rail pressure drop value, RPD, or IF=F(RPD). In the illustrated embodiment in which the flow rate of fuel into the fuel rail (20 or 22) is zero as a result of closing or otherwise disabling the fuel metering valve 16 and/or the fuel pump 18 (see step 78 of FIG. 4A) and in which the rail pressure drop value, RPD, represents the drop in rail pressure attributable to the fuel injection event, the main control logic block 54" is operable to execute step 352 by computing the estimate of the injected fuel quantity, IF, according to the equation IF=(V*RPD)/B, where V=the internal volume of the fuel rail (20 or 22), RPD is the rail pressure drop value for the current engine cycle, and B is the bulk modulus of the fuel drawn from the fuel source 12. In one embodiment, V and B are known values, although this disclosure contemplates that B may be determined periodically as a function of one or more known and/or measured characteristics of the fuel and/or fuel system. Alternatively, the injected fuel quantity, IF, may be estimated at step 352 according to one or more other known functions of RPD.

The algorithm 54A" advances from step 352 to step 354 where the main control logic block 54" is operable to determine a fuel leakage quantity, FL, corresponding to an estimate of the amount of fuel leakage from the fuel rail (20 or 22), e.g., back to the fuel source 12, by the currently selected (Kth) one of the fuel injectors $24_1$-$24_N$ during the current engine cycle, as a function of the parasitic leakage drop value, PLD, or FL=F(PLD). In the illustrated embodiment in which the flow rate of fuel into the fuel rail (20 or 22) is zero as a result of closing or otherwise disabling the fuel metering valve 16 and/or the fuel pump 18 (see step 78 of FIG. 4A) and in which the parasitic leakage drop value, PLD, represents the drop in rail pressure attributable to all of the fuel injectors during non-fuel injection times, the main control logic block 54" is operable to execute step 354 by computing the estimate of the fuel leakage quantity, FL, according to the equation FL=(V/B)*(PLD−$PLD_0$), where V=the internal volume of the fuel rail (20 or 22), B is the bulk modulus of the fuel drawn from the fuel source 12, PLD is the rail pressure drop value for the current engine cycle, and $PLD_0$ is the parasitic leakage drop value when none of the fuel injectors $24_1$-$24_N$ are commanded, i.e., when OT=0 for each of the fuel injectors $24_1$-$24_N$. In one embodiment, V and B are known values, although this disclosure contemplates that B may be determined periodically as a function of one or more known and/or measured characteristics of the fuel and/or fuel system. Referring again to FIG. 5, the rail pressure characteristic 120 corresponds to the drop in fuel rail pressure, RP, when none of the fuel injectors $24_1$-$24_N$ are commanded, i.e., OT=0 for all of the fuel injectors $24_1$-$24_N$. Accordingly, the parasitic fuel leakage for the currently commanded one of the number of fuel injectors $24_1$-$24_N$ corresponds to the parasitic leakage drop, PLD, less the parasitic leakage drop, $PLD_0$, when none of the fuel injectors $24_1$-$24_N$ are commanded. The algorithm illustrated in FIG. 4A may therefore include an additional step, e.g., between steps 78 and 80, where $PLD_0$ is determined. Inclusion of such a step would be a mechanical step for a skilled artisan. In alternative embodiments, the fuel leakage quantity, FL, may be estimated at step 354 according to one or more other known functions of PLD.

Following step 354, execution of the algorithm 54A" advances to step 356 where the main control logic block 54" is operable to store in memory 32 the injected fuel and/or fuel leakage quantity values, IF and FL respectively, along with other information relating to the currently commanded one of the fuel injectors $24_1$-$24_N$, e.g., injector identifier, K, and/or commanded on-time, OT. Thereafter at step 358, the main control logic block 54" is operable to determine whether injected fuel quantity values, IF, (and/or parasitic fuel leakage quantity values, FL) have been determined for all of the injectors $24_1$-$24_N$. If not, the algorithm 54A" advances to step 360 where the main control logic block 54" is operable to select a new injector K from the remaining ones of the injectors $24_1$-$24_N$ for which an injected fuel quantity value, IF, (and/or parasitic fuel leakage quantity value, FL) has note been determined. From step 360, the algorithm 54A" loops back to step 80 of FIG. 4A. If, at step 360, the main control logic block 54" determines that injected fuel quantity values, IF, (and/or parasitic fuel leakage quantity values, FL) have been determined for all of the injectors $24_1$-$24_N$, the algorithm 54A" advances to step 362 where the main control logic block 54" is operable to produce a fuel inlet metering valve command value, FIVC, that corresponds to an open fuel inlet metering valve 16. The fueling logic block 50 is responsive to the fuel inlet metering valve command value, FIVC, produced by the injector health determination logic block to command the fuel inlet metering valve 16 to an open position and to resume fuel pump commands to a fuel pump 18. The algorithm 54A" advances from step 362 to step 364 where the algorithm 54A" ends.

Figure 18:
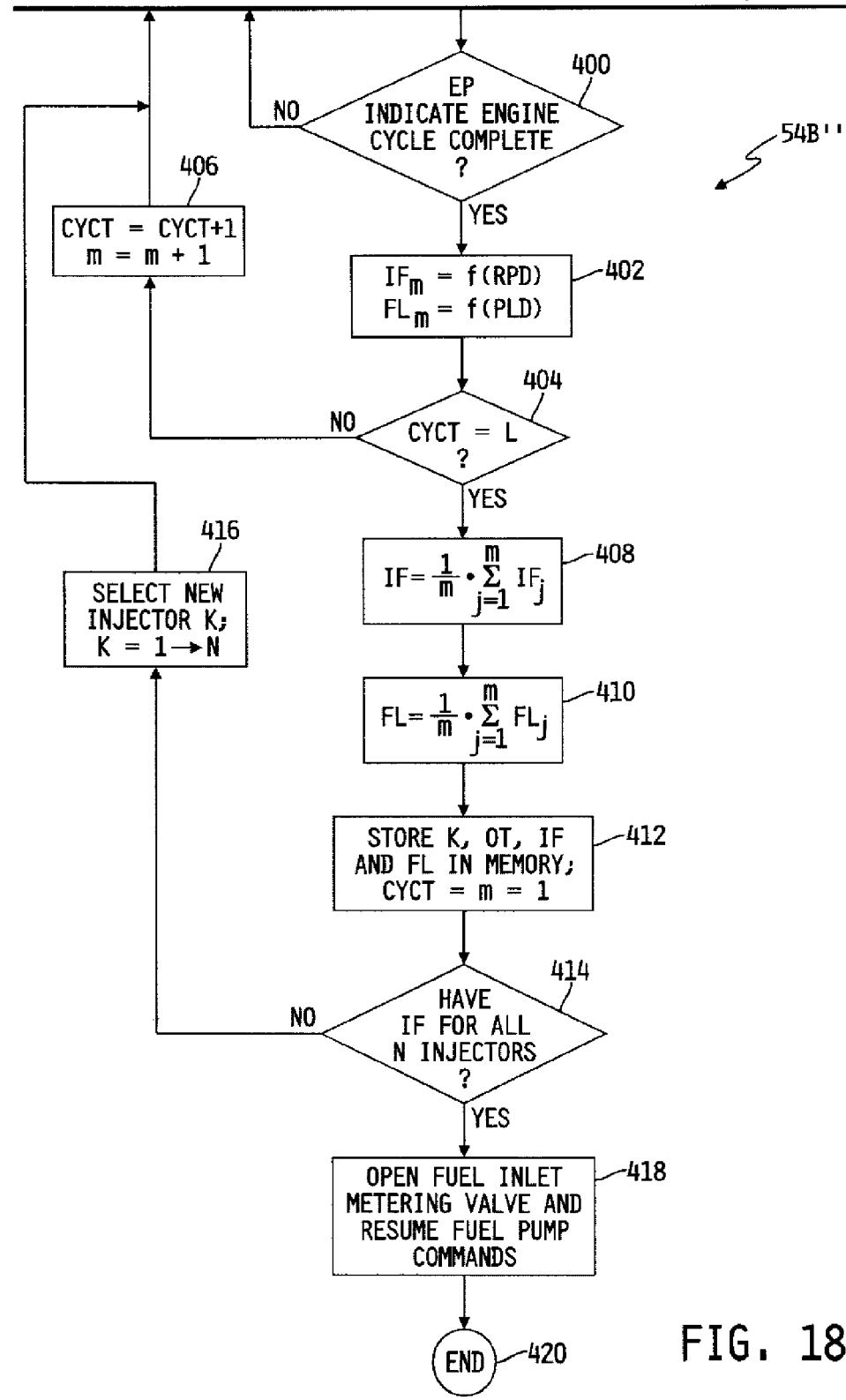
FIG. 18 is a flowchart of another illustrative embodiment of a portion of the main control logic block of FIG. 16.

Referring now to FIG. 18, a flow chart of another illustrative embodiment of a software algorithm representing a portion of the main control logic block 54" of FIG. 16 is shown. In the illustrated embodiment, the software algorithm of FIG. 18 utilizes the portion of the software algorithm 54 illustrated and described hereinabove with respect to FIG. 4A. The portion of the software algorithm 54 illustrated in FIG. 4A and the software algorithm illustrated in FIG. 18 together form a software algorithm 54B" that defines another illustrative embodiment of the main control logic block 54". The software algorithm 54B" may illustratively be stored in the memory unit 32 in the form of instructions that are executable by the control circuit 30 to control the fuel system of FIG. 1 as will be described hereinafter.

The algorithm 54B" generally differs from the algorithm 54A" in that the injected fuel quantity values, IF, and the parasitic fuel leakage values, FL, are determined for each of the number of fuel injectors $24_1$-$24_N$ as the averages of IF and FL values determined over a plurality of engine cycles in which the injector on-time command, OT, is held constant. In this regard, step 90 of FIG. 4A advances to step 400 where the main control logic block 54" is operable to determine from the current engine position, EP, whether the current engine cycle is complete. If not, execution of the algorithm 54B" loops back to step 86. If, on the other hand, the main control logic block 54" determines at step 400 that the current engine cycle is complete, the algorithm 54B" advances to step 402 where the main control logic block 54" is operable to determine for the current engine cycle, m, the injected fuel quantity, $IF_m$, and/or the parasitic fuel leakage quantity, $FL_m$, according to any of the techniques described hereinabove with respect to FIG. 17. Thereafter at step 404, the main control logic block 54" is operable to determine whether the current value of an engine cycle counter, CYCT, has reached a predefined, e.g., programmed, value, L, that represents a total number of engine cycles over which IF and/or FL for the currently selected one (Kth) of the fuel injectors $24_1$-$24_N$ is to be determined. The value L may be set to any positive integer value. Initial values of CYCT and m will illustratively be pre-programmed, and may be reset to their initial values by a subsequent step in the algorithm 54B" as will be described hereinafter.

In any case, if the main control logic block 54" determines at step 404 that the engine cycle counter, CYCT, has not yet reached the value L, the algorithm 54B" advances to step 406 where the main control logic block 54" is operable to increment CYCT and m, e.g., by the value 1. Thereafter, the algorithm 54B" loops back to step 80 (FIG. 4A). If, at step 404, the main control logic block 54" determines that the engine cycle counter, CYCT, has reached the value L, algorithm execution advances to step 408 where the main control logic block 54" is operable to determine IF, corresponding to an estimate of the amount of fuel injected into the engine 28 by the currently selected (Kth) one of the fuel injectors $24_1$-$24_N$ averaged over L engine cycles, as a function of the per-engine cycle fuel injection amount values $IF_j$. In the illustrated embodiment, for example, the main control logic block 54" is operable to compute IF as an algebraic average of the per-engine cycle fuel injection amount values, $IF_j$, according to the equation $IF=(1/m)*(\Sigma^m_{j=1} IF_j)$. Alternatively, the main control logic block 54" may be operable at step 408 to compute IF according to one or more other known averaging equations and/or functions. Following step 408, the main control logic block 54" is operable to determine FL, corresponding to an estimate of fuel leakage by the currently selected (Kth) one of the fuel injectors $24_1$-$24_N$ averaged over L engine cycles, as a function of the per-engine cycle fuel leakage values $FL_j$. In the illustrated embodiment, for example, the main control logic block 54" is operable to compute FL as an algebraic average of the per-engine cycle fuel leakage amount values, $FL_j$, according to the equation $FL=(1/m)*(\Sigma^m_{j=1} FL_j)$. Alternatively, the main control logic block 54" may be operable at step 410 to compute FL according to one or more other known averaging equations and/or functions.

Following step 410, execution of the algorithm 54B" advances to step 412 where the main control logic block 54" is operable to store in memory 32 the injected fuel and/or fuel leakage quantity values, IF and FL respectively, along with other information relating to the currently commanded one of the fuel injectors $24_1$-$24_N$, e.g., injector identifier, K, and/or commanded on-time, OT, and to also reset CYCT and m to 1. Thereafter at step 414, the main control logic block 54" is operable to determine whether injected fuel quantity values, IF, (and/or parasitic fuel leakage quantity values, FL) have been determined for all of the injectors $24_1$-$24_N$. If not, the algorithm 54B" advances to step 416 where the main control logic block 54" is operable to select a new injector K from the remaining ones of the injectors $24_1$-$24_N$ for which an injected fuel quantity value, IF, (and/or parasitic fuel leakage quantity value, FL) has not been determined. From step 416, the algorithm 54B" loops back to step 80 of FIG. 4A. If, at step 414, the main control logic block 54" determines that injected fuel quantity values, IF, (and/or parasitic fuel leakage quantity values, FL) have been determined for all of the injectors $24_1$-$24_N$, the algorithm 54B" advances to step 418 where the main control logic block 54" is operable to produce a fuel inlet metering valve command value, FIVC, that corresponds to an open fuel inlet metering valve 16. The fueling logic block 50 is responsive to the fuel inlet metering valve command value, FIVC, produced by the injector health determination logic block to command the fuel inlet metering valve 16 to an open position and to resume fuel pump commands to a fuel pump 18. The algorithm 54B" advances from step 418 to step 420 where the algorithm 54B" ends.

Figure 19:
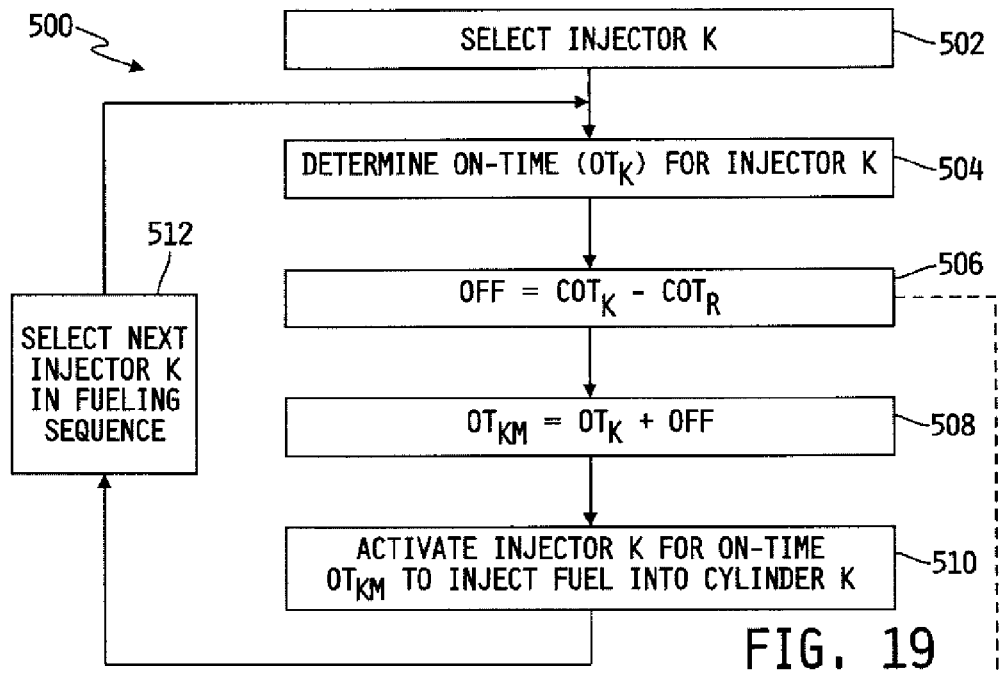
FIG. 19 is a flowchart of one illustrative embodiment of a process for adjusting commanded on-times for one or more fuel injectors based on one or more corresponding critical on-times.

Referring now to FIG. 19, a flowchart is shown of one illustrative embodiment of a process 500 for adjusting on-times (OT) for one or more fuel injectors $24_1$-$24_N$ based on the one or more corresponding critical on-times, $COT_1$-$COT_N$ to correct for changes in the injector characteristics during operation of the fuel system. Illustratively, the process 500 is stored in the memory unit 32 of the control circuit 30 in the form of instructions that are executable by the control circuit 500 to adjust the one or more commanded on-times. The process 500 begins at step 502 where the control circuit 30 selects a Kth one of the fuel injectors $24_1$-$24_N$ to inject fuel into a corresponding one of the cylinders $26_1$-$26_N$ for an on-time duration. The process 500 advances from step 502 to step 504 where the control circuit 30 is operable to determine an on-time, $OT_K$, for the Kth injector. It will be understood that steps 502 and 504 will typically be part of a conventional fueling algorithm that is executed by the control circuit 30, e.g., by the fueling logic block 52 of FIG. 2, to control fueling of the engine 28. The Kth one of the fuel injectors $24_1$-$24_N$ corresponds, in such cases, to the current one of the fuel injectors $24_1$-$24_N$ in the predetermined fueling sequence, e.g., predetermined sequence of cylinders in which fueling of the engine 30 is carried out, and $OT_K$ is the duration of the corresponding injector activation signal generated by the control circuit 30 at the output $FIC_K$.

The process 500 advances from step 504 to step 506 where the control circuit 30 is operable to compute an offset value, OFF, as a difference between the critical on-time value, $COT_K$, for the Kth fuel injector $24_K$ and a reference critical on-time value, $COT_R$. The process 500 assumes that critical on-time value, $COT_K$, for the Kth fuel injector $24_K$ has been previously determined, and that the $COT_K$ value is available to the process 500. Illustratively, critical on-times for all of the fuel injectors $24_1$-$24_N$ are determined prior to the execution of the process 500 using any one or more of the processes illustrated and described herein, and critical on-time values, $COT_1$-$COT_N$, for each of the for each of the corresponding fuel injectors, $24_1$-$24_N$, are stored in the memory unit 32. At step 506, the control circuit 30 is operable in this embodiment to determine $COT_K$ by retrieving the critical on-time value for the Kth injector from the memory unit 32. It will be understood that $COT_K$ may represent the most recently stored $COT_K$ value, an average of a number of stored $COT_K$ values, or other function of one or more $COT_K$ values. The reference critical on-time, $COT_R$, is illustratively a critical on-time value that represents an expected critical on-time for properly functioning one of the particular type of fuel injector $24_K$ being used. Alternatively, $COT_R$ may represent a target critical on-time value that may or may not be, or relate to, the expected critical on-time. In any case, $COT_R$ may or may not be identical for all or some of the fuel injectors $24_1$-$24_N$.

The process 500 advances from step 506 to step 508 where the control circuit 30 is operable to determine a modified, i.e., adjusted, on time, $OT_{KM}$, for the Kth fuel injector, $24_K$, generally as a function of the on-time, $OT_K$, for the Kth fuel injector $24_K$, the critical on-time, $COT_K$, for the Kth fuel injector $24_K$ and the reference critical on-time $COT_R$, and more specifically as a function of the on-time, $OT_K$, for the Kth fuel injector $24_K$, and the offset value, OFF. In the embodiment illustrated in FIG. 19, for example, the control circuit 30 is operable to execute step 508 by modifying $OT_K$ according to the equation $OT_{KM}=OT_K+OFF$, where $OT_{KM}$ represents the modified or adjusted on-time for the Kth fuel injector $24_K$. Thus, if $COT_K$ is greater than $COT_R$, the duration of $OT_{KM}$ will be greater than that of the on-time, $OT_K$, computed at step 504 pursuant to the conventional fueling logic 52, and if $COT_K$ is less than $COT_R$, the duration of $OT_{KM}$ will be less than that of the on-time computed at step 504. It will be understood that this disclosure contemplates that the control circuit 30 may be alternatively configured at step 508 to modify or adjust the on-time, $OT_K$, that was determined at step 504 as other functions of the offset value, OFF, examples of which include, but should not be limited to, an average of a number of the offset values, OFF, or the like.

Following step 508, the control circuit 30 is operable at step 510 to activate the Kth injector $24_K$ the modified or adjusted on-time, $OT_{KM}$, to inject fuel into the Kth cylinder $26_K$ of the engine 28 for the duration specified by $OT_{KM}$. Thereafter at step 512, the control circuit 30 is operable to redefine K as the next (Kth) one of the fuel injectors $24_1$-$24_N$ in the fueling sequence. As with steps 502 and 504, steps 510 and 512 will typically be part of the conventional fueling algorithm that is executed by the control circuit 30, e.g., by the fueling logic block 52 of FIG. 2, to control fueling of the engine 28. Activation of the Kth one of the fuel injectors $24_1$-$24_N$ at step 510 is thus carried out in a conventional manner, and selection of the next fuel injector in the fueling sequence at step 512 is likewise carried out in a conventional manner. In any case, the process 500 loops from step 512 back to step 504 for continual execution of the process 500 to control fueling of the engine 28.

Figure 20:
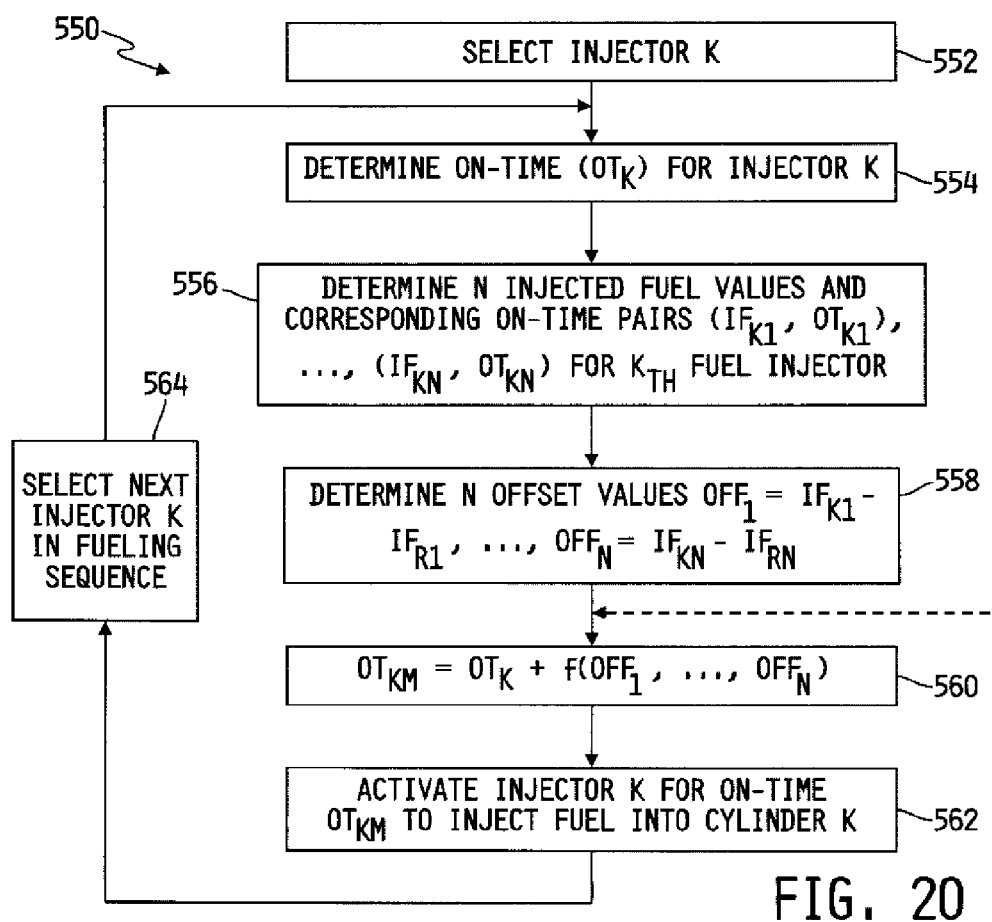
FIG. 20 is a flowchart of one illustrative embodiment of a process for adjusting commanded on-times for one or more fuel injectors based on one or more corresponding injected fuel quantity estimates.

Referring now to FIG. 20, a flowchart is shown of one illustrative embodiment of a process 550 for adjusting on-times for one or more fuel injectors based on one or more corresponding injected fuel quantity estimates. Illustratively, the process 550 is stored in the memory unit 32 of the control circuit 30 in the form of instructions that are executable by the control circuit 500 to adjust the one or more commanded on-times. The process 550 has several steps in common with the process 500 just described. For example, step 552 of the process 550 is identical to step 502 of the process 500, step 554 of the process 550 is identical to step 504 of the process 500, step 562 of the process 550 is identical to step 510 of the process 500 and step 564 of the process 550 is identical to step 512 of the process 500. Description of steps 552, 554, 562 and 564 of the process 550 will not be repeated here for brevity.

Step 554 of the process 550 advances to step 556 where the control circuit 30 is operable to determine a number, N, of injected fuel values (IF) and corresponding on-time (OT) pairs ($IF_{K1}, OT_{K1}$), . . . , ($IF_{KN}, OT_{KN}$) for the Kth fuel injector $24_K$, where N may be any positive integer. The process 550 assumes that the one or more injected fuel (IF) and corresponding on-time (OT) pairs have been previously determined, and that they are available to the process 550. Illustratively, injected fuel values, IF, are determined for a number of different corresponding on-times, OT, for each of the fuel injectors $24_1$-$24_N$ prior to the execution of the process 550 using any one or more of the processes illustrated and described herein, e.g., either of the processes illustrated in FIGS. 18 and 19, and such injected fuel and corresponding on-time pairs are stored in the memory unit 32. The control circuit 30 is accordingly operable in such embodiments to execute step 556 by retrieving the number of injected fuel values and corresponding on-time pairs ($IF_{K1}, OT_{K1}$), . . . , ($IF_{KN}, OT_{KN}$) for the Kth fuel injector $24_K$ from the memory unit 32.

The number N may vary depending upon a desired implementation of the process 550. As one example, N may be one, and the injected fuel value and corresponding on-time pair may be determined at step 556 by selecting an injected fuel value for the Kth injector $24_K$ having a corresponding on-time that is equal to, or is near, e.g., close in value to, the on-time, $OT_K$, that was determined by the control circuit 30 at step 554. The injected fuel value, IF, having such a corresponding on-time value thus represents an estimate of the actual quantity of injected fuel by the Kth fuel injector $24_K$ when commanded for an on-time of $OT_K$. Alternatively, IF may be an average of a number of such injected fuel values for the Kth fuel injector $24_K$, or may alternatively still be some other function of one or more such injected fuel values. As another example, N may be greater than 1, and the multiple injected fuel value and corresponding on-time value pairs may be determined at step 556 by selecting injected fuel values for the Kth injector $24_K$ having corresponding on-times that are less than, greater than, less than and greater than, or otherwise distributed about, the on-time $OT_K$ that was determined by the control circuit 30 at step 554. Alternatively, the multiple injected fuel values may each be averages of a number of such injected fuel values for the Kth fuel injector $24_K$, or may alternatively still be some other function of one or more such injected fuel values. At least one of the multiple injected fuel values may have a corresponding on-time value that is near or equal to the generated on-time $OT_K$.

In any case, the process 550 advances from step 556 to step 558 where the control circuit 30 is operable to determine a corresponding number, N, of offset values, $OFF_1$-$OFF_N$, for the Kth fuel injector $24_K$ each as a difference between a different one of the injected fuel values, $IF_{K1}$-$IF_{KN}$, and a corresponding reference injected fuel value, $IF_{RL}$-$IF_{RN}$, such that the N offset values are computed as $OFF_1=IF_{K1}-IF_{R1}$, . . . , $OFF_N=IF_{KN}-IF_{RN}$. The reference injected fuel values, $IF_{RL}$-$IF_{RN}$, are illustratively each injected fuel values that represent an expected injected fuel quantity based on activation thereof for a corresponding commanded on-time for a properly functioning one of the particular type of fuel injector $24_K$ being used. Alternatively, $IF_{RL}$-$IF_{RN}$, may represent target injected fuel quantity values that may or may not be, or relate to, expected injected fuel quantities.

The process 550 advances from step 558 to step 560 where the control circuit 30 is operable to determine a modified or adjusted on-time, $OT_{KM}$, for the Kth fuel injector $24_K$ generally as a function of the generated on-time, $OT_K$, the one or more injected fuel quantities, $IF_{K1}$-$IF_{KN}$, and the one or more corresponding reference injected fuel quantities, $IF_{RL}$-$IF_{RN}$. More specifically, the control circuit 30 is operable at step 560 to determine the modified or adjusted on-time, $OT_{KM}$, for the Kth fuel injector, $24_K$, based on the generated on-time, $OT_K$, and a function of the one or more offset values, $OFF_1$-$OFF_N$. In the embodiment illustrated in FIG. 20, for example, the control circuit 30 is operable to execute step 508 by modifying $OT_K$ according to the equation $OT_{KM}$=$OT_K$+F ($OFF_1$, . . . , $OFF_N$), where $OT_{KM}$ represents the modified on-time for the Kth fuel injector $24_K$. Illustratively, the function F($OFF_1$, . . . , $OFF_N$) may represent a mathematical combination of $OFF_1$, . . . , $OFF_N$, a known function of $OFF_1$, . . . , $OFF_N$, a conventional statistical process performed on $OFF_1$, . . . , $OFF_N$, or the like. In an alternative embodiment, as shown by dashed line representation, step 506 of the process 500 may be executed prior to step 560 of the process 550 so that the function F($OFF_1$, . . . , $OFF_N$) in the computation of $OT_{KM}$ at step 560 may further include the offset value OFF determined by step 506 such that the function at step 560 then becomes F(OFF, $OFF_1$, . . . , $OFF_N$). In any case, it should be apparent that the modification of the on-time, $OT_{KM}$, for the Kth fuel injector $24_K$ that is computed at step 560 may be based on one or more injected fuel quantities that correspond to previously determined estimates of injected fuel quantities by the Kth fuel injector, and may further be based on an offset value computed as a function of the critical on-time, $COT_K$, for the Kth fuel injector $24_K$.

Following step 560, the process 550 advances to step 562 where the control circuit 30 is operable to activate the Kth injector $24_K$ the modified on-time, $OT_{KM}$, to inject fuel into the Kth cylinder $26_K$ of the engine 28 for the duration specified by $OT_{KM}$, as described hereinabove with respect to step 510 of the process 500. Thereafter at step 564, the control circuit is operable to redefine K as the next (Kth) one of the fuel injectors $24_1$-$24_N$ in the fueling sequence, as described hereinabove with respect to step 512 of the process 500. Following step 564, the process 550 loops back to step 554 for continual execution of the process 550 to control fueling of the engine 28.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected.

What is claimed is:

1. A system for determining a critical on-time for a selected one of a plurality of fuel injectors in a fuel system for an internal combustion engine, comprising:
    a fuel inlet metering valve having an inlet fluidly coupled to a source of fuel,
    a fuel pump having an inlet coupled to an outlet of the fuel inlet metering valve,
    a fuel rail coupled to an outlet of the fuel pump,
    a pressure sensor fluidly coupled to the fuel rail and configured to produce a pressure signal indicative of fuel pressure within the fuel rail,
    a plurality of fuel injectors fluidly coupled to the fuel rail, and
        a control circuit including a memory having instructions stored therein that are executable by the control circuit to control the fuel inlet metering valve to disable fuel flow from the source of fuel to the fuel rail, to periodically sample the pressure signal, to activate the selected fuel injector for an on-time duration while inhibiting fuel injection by remaining ones of the plurality of fuel injectors, to determine from the pressure signal samples a first pressure drop in the fuel rail resulting from activation of the selected fuel injector for the on-time duration, to process the first pressure drop to determine whether or not the selected fuel injector injected fuel into the engine in response to activation for the on-time duration, and to repeatedly modify the on-time duration and then execute the periodically sampling, activating, determining and processing steps until a critical on-time is determined that corresponds to a minimum on-time duration to which the selected fuel injector is responsive to inject a discernable amount of fuel into the engine.

2. The system of claim 1 wherein the instructions stored in the memory further include instructions that are executable by the control circuit to determine from the pressure signal samples a second pressure drop in the fuel rail pressure resulting from leakage of fuel by the fuel system when none of the plurality of fuel injectors is injecting fuel into the engine, and to determine from the pressure signal samples a mean value of the pressure signal samples,
    wherein the instructions stored in the memory further include instructions that are executable by the control circuit to determine whether or not the selected fuel injector injected fuel into the engine in response to activation for the on-time duration by processing the first pressure drop, the second pressure drop and the mean value of the fuel pressure samples to determine whether or not the selected fuel injector injected fuel into the engine in response to activation of the selected fuel injector for the on-time duration.

3. The system of claim 2 wherein the instructions stored in the memory are executable by the control circuit to produce the inject/no-inject value during a single engine cycle,
    and wherein the instructions stored in the memory further include instructions that are executable by the control circuit to process a number of inject/no-inject values produced over a corresponding number of engine cycles to according to a voting process to determine whether or not the selected fuel injector injected fuel into the engine in response to activation of the selected fuel injector for the on-time duration.

4. The system of claim 3 wherein the instructions stored in the memory further include instructions that are executable by the control circuit to process the number of inject/no-inject values by determining a vote number corresponding to a number of times over the number of engine cycles that the inject/no-inject value indicates that the selected fuel injector injected fuel into the engine in response to activation of the selected fuel injector for the on-time duration, by determining that the selected fuel injector injected fuel into the engine in response to activation of the selected fuel injector for the on-time duration if the vote number reaches a pass count value, and by otherwise determining that the selected fuel injector did not inject a discernable amount of fuel into the engine in response to activation of the selected fuel injector for the on-time duration.

5. The system of claim 3 wherein the instructions stored in the memory further include instructions that are executable by the control circuit to process the number of inject/no-inject values by determining a vote number corresponding to a number of times that the inject/no-inject value indicates that the selected fuel injector injected fuel into the engine in response to activation of the selected fuel injector for the on-time duration, by determining that the selected fuel injector injected fuel into the engine in response to activation of the selected fuel injector for the on-time duration if the vote number reaches a pass count value before the number of engine cycles reaches an engine cycle count value, and by determining that the selected fuel injector did not inject a discernable amount of fuel into the engine in response to activation of the selected fuel injector for the on-time duration if the number of engine cycles reaches the engine cycle count value before the vote number reaches the pass count value.

6. The system of claim 1 wherein the instructions stored in the memory further include instructions that are executable by the control circuit to determine whether or not the selected fuel injector injected fuel into the engine in response to activation for the on-time duration by processing the first pressure drop, the second pressure drop and the mean value of the fuel pressure using a first discriminant function to produce an inject value corresponding to a likelihood that the activation of the selected fuel injector for the on-time duration resulted in injection of fuel by the selected fuel injector into the engine, by processing the first pressure drop, the second pressure drop and the mean value of the fuel pressure using a second discriminant function to produce an inject-not value corresponding to a likelihood that the activation of the selected fuel injector for the on-time duration resulted in no injection of fuel by the selected fuel injector into the engine, and by processing the inject and inject not values to produce an inject/no-inject value, the inject/no-inject value having a value indicating that the selected fuel injector injected fuel into the engine in response to activation of the selected fuel injector for the on-time duration if the inject value is greater than the inject-not value, and otherwise having a value indicating that the selected fuel injector did not inject fuel into the engine in response to activation of the selected fuel injector for the on-time duration.

7. The system of claim 1 wherein the instructions stored in the memory further include instructions that are executable by the control circuit to store the critical on-time in the memory.

8. The system of claim 1 wherein the instructions stored in the memory further include instructions that are executable by the control circuit to determine critical on-times for remaining ones of the plurality of fuel injectors.

9. The system of claim 1 wherein the instructions stored in the memory further include instructions that are executable by the control circuit to determine the critical on-time using the pressure signal sampled over a single engine cycle.

10. A method of determining a critical on-time for a selected one of a plurality of fuel injectors coupled to a source of fuel via a fuel rail of a fuel system for an internal combustion engine, the method comprising:
disabling fuel flow from the source of fuel to the fuel rail,
periodically sampling fuel rail pressure,
activating the selected fuel injector for an on-time duration while inhibiting fuel injection by remaining ones of the plurality of fuel injectors,
determining from the fuel rail pressure samples a first pressure drop in the fuel rail resulting from activation of the selected fuel injector for the on-time duration,
processing the first pressure drop to determine whether or not the selected fuel injector injected fuel into the engine in response to activation for the on-time duration,
repeatedly modifying the on-time duration and then executing the periodically sampling, activating, determining and processing steps until a critical on-time is determined that corresponds to a minimum on-time duration to which the selected fuel injector is responsive to inject a discernable amount of fuel into the engine.

11. The method of claim 10 further comprising storing the critical on-time for the selected fuel injector in a memory unit.

12. The method of claim 10 wherein periodically sampling, activating, determining, processing and repeatedly modifying are carried out for remaining ones of the plurality of fuel injectors to determine a critical on-time for each of the remaining ones of the plurality of fuel injectors.

13. The method of claim 10 wherein the on-time duration is initially selected such that activation of the selected fuel injector for the on-time duration does not result in injection of any discernable amount of fuel into the engine,
and wherein repeatedly modifying the on-time duration comprises successively incrementing the on-time duration by an increment value.

14. The method of claim 10 wherein the on-time duration is initially selected such that activation of the selected fuel injector for the on-time duration results in injection of fuel into the engine,
and wherein repeatedly modifying the on-time duration comprises successively decrementing the on-time duration by a decrement value.

15. The method of claim 10 wherein repeatedly modifying the on-time duration comprises selecting on-time durations on either side of an expected critical on-time for the selected injector and then incrementally advancing the on-time duration toward the expected critical on-time until the minimum on-time duration is determined.

16. The method of claim 10 wherein each execution of the periodically sampling, activating, determining and processing steps is carried out over a single engine cycle.

17. The method of claim 10 further comprising:
determining from the fuel rail pressure samples a second pressure drop in the fuel rail pressure resulting from leakage of fuel by the fuel system when none of the plurality of fuel injectors is injecting fuel into the engine, and
determining from the fuel pressure samples a mean value of the fuel pressure samples,
wherein processing the first pressure drop further comprises processing the first pressure drop, the second pressure drop and the mean value of the fuel pressure samples to determine whether or not the selected fuel injector injected fuel into the engine in response to activation of the selected fuel injector for the on-time duration.

18. The method of claim 17 wherein the processing step comprises:
processing the first pressure drop, the second pressure drop and the mean value of the fuel pressure using a first discriminant function to produce an inject value corresponding to a likelihood that the activation of the selected fuel injector for the on-time duration resulted in injection of fuel by the selected fuel injector into the engine,
processing the first pressure drop, the second pressure drop and the mean value of the fuel pressure using a second discriminant function to produce an inject-not value corresponding to a likelihood that the activation of the selected fuel injector for the on-time duration resulted in no injection of fuel by the selected fuel injector into the engine, and
processing the inject and inject not values to produce an inject/no-inject value, the inject/no-inject value having a value indicating that the selected fuel injector injected fuel into the engine in response to activation of the selected fuel injector for the on-time duration if the inject value is greater than the inject-not value, and otherwise having a value indicating that the selected fuel injector did not inject fuel into the engine in response to activation of the selected fuel injector for the on-time duration.

19. The method of claim 18 wherein each execution of the steps of periodically sampling, activating, determining the first pressure drop, determining the second pressure drop, determining the mean value of the fuel pressure, processing the first pressure drop, processing the second pressure drop and processing the inject and inject not values is carried out over a single engine cycle.

20. The method of claim 19 further comprising processing a number of inject/no-inject values produced over a corresponding number of engine cycles to according to a voting process to determine whether or not the selected fuel injector injected fuel into the engine in response to activation of the selected fuel injector for the on-time duration.

21. The method of claim 20 wherein processing the number of inject/no-inject values comprises:
determining a vote number corresponding to a number of times over the number of engine cycles that the inject/no-inject value indicates that the selected fuel injector injected fuel into the engine in response to activation of the selected fuel injector for the on-time duration,
determining that the selected fuel injector injected fuel into the engine in response to activation of the selected fuel injector for the on-time duration if the vote number reaches a pass count value, and otherwise determining that the selected fuel injector did not inject a discernable amount of fuel into the engine in response to activation of the selected fuel injector for the on-time duration.

22. The method of claim 20 wherein processing the number of inject/no-inject values comprises:
determining a vote number corresponding to a number of times that the inject/no-inject value indicates that the selected fuel injector injected fuel into the engine in response to activation of the selected fuel injector for the on-time duration,
determining that the selected fuel injector injected fuel into the engine in response to activation of the selected fuel injector for the on-time duration if the vote number reaches a pass count value before the number of engine cycles reaches an engine cycle count value, and
determining that the selected fuel injector did not inject a discernable amount of fuel into the engine in response to activation of the selected fuel injector for the on-time duration if the number of engine cycles reaches the engine cycle count value before the vote number reaches the pass count value.

23. The method of claim 17 further comprising:
filtering the second pressure drop over time to produce a filtered parasitic leakage value,
comparing the filtered parasitic leakage value to a leakage threshold value, and
storing an excessive parasitic leakage value, that is indicative of an excessive parasitic leakage condition, in a memory unit in a memory unit if the filtered parasitic leakage value is greater than the leakage threshold value.

* * * * *